US012426076B2

(12) United States Patent
Liu et al.

(10) Patent No.: US 12,426,076 B2
(45) Date of Patent: Sep. 23, 2025

(54) INFORMATION TRANSMISSION METHOD AND APPARATUS

(71) Applicant: HUAWEI TECHNOLOGIES CO., LTD., Guangdong (CN)

(72) Inventors: Zhe Liu, Shenzhen (CN); Chao Li, Beijing (CN); Xingwei Zhang, Lund (SE); Junwei Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 362 days.

(21) Appl. No.: 17/671,977

(22) Filed: Feb. 15, 2022

(65) Prior Publication Data

US 2022/0174684 A1    Jun. 2, 2022

Related U.S. Application Data

(63) Continuation of application No. PCT/CN2020/108382, filed on Aug. 11, 2020.

(30) Foreign Application Priority Data

Aug. 15, 2019    (CN) .......................... 201910755198.7

(51) Int. Cl.
*H04W 72/56* (2023.01)
*H04W 72/25* (2023.01)
*H04W 72/40* (2023.01)

(52) U.S. Cl.
CPC ........... *H04W 72/56* (2023.01); *H04W 72/25* (2023.01); *H04W 72/40* (2023.01)

(58) Field of Classification Search
CPC ................. H04W 36/18; H04W 36/28; H04W 72/0446; H04W 72/56–569;

(Continued)

(56) References Cited

U.S. PATENT DOCUMENTS 9,491,777 B2 * 11/2016 Chen ..................... H04W 72/21
12,150,163 B2 * 11/2024 Chae ................. H04W 72/0453
(Continued)

FOREIGN PATENT DOCUMENTS

CN         105432126 A     3/2016
CN         105850197 A     8/2016
(Continued)

OTHER PUBLICATIONS

"RACH", sharetechnote.com, https://web.archive.org/web/20190707190224/http://sharetechnote.com:80/html/RACH_LTE.html. Jul. 7, 2019.*

(Continued)

*Primary Examiner* — Brendan Y Higa
(74) *Attorney, Agent, or Firm* — WOMBLE BOND DICKINSON (US) LLP

(57) ABSTRACT

This application provides an information transmission method and apparatus, to resolve a problem of a conflict between resources used by a terminal device to send/receive information in different radio access systems, ensure successful transmission of information with a high priority, and improve communication quality. A terminal device determines information with a higher priority in first information associated with a first radio access system and second information associated with a second radio access system. Time domain resources associated with the first information and the second information are completely or partially the same. The first information is data information and the second information is synchronization information, or the first information is synchronization information and the second information is synchronization information. The terminal device sends or receives the information with the higher priority.

20 Claims, 6 Drawing Sheets

(58) Field of Classification Search
CPC ..... H04W 36/0069–00698; H04W 68/005–02; H04W 72/02; H04W 72/04; H04W 72/12; H04W 72/20; H04W 72/25; H04W 72/40; H04W 76/15; H04W 76/27–28; H04W 88/06; H04W 72/4056–569
See application file for complete search history.

(56) References Cited

U.S. PATENT DOCUMENTS

| | | | |
|---|---|---|---|
| 2016/0338071 A1 | 11/2016 | Khosla et al. | |
| 2017/0339679 A1 | 11/2017 | Lee et al. | |
| 2018/0242263 A1 | 8/2018 | Lee et al. | |
| 2019/0007913 A1* | 1/2019 | Tsai | H04W 76/15 |
| 2019/0075548 A1 | 3/2019 | Lee et al. | |
| 2019/0150135 A1 | 5/2019 | Lee et al. | |
| 2020/0186315 A1* | 6/2020 | Li | H04W 72/56 |
| 2020/0288431 A1* | 9/2020 | Lee | H04W 56/0015 |
| 2021/0385821 A1* | 12/2021 | Yeo | H04W 72/0446 |
| 2022/0070879 A1* | 3/2022 | Ryu | H04W 72/56 |
| 2022/0095368 A1* | 3/2022 | Yu | H04W 72/0446 |

FOREIGN PATENT DOCUMENTS

| | | |
|---|---|---|
| CN | 105960023 A | 9/2016 |
| CN | 108012332 A | 5/2018 |
| CN | 108270516 A | 7/2018 |
| CN | 109152032 A | 1/2019 |
| CN | 109792353 A | 5/2019 |
| CN | 111083732 A | 4/2020 |
| KR | 20200086566 A * | 7/2020 |
| WO | 2015124649 A1 | 8/2015 |
| WO | 2017173133 A1 | 10/2017 |
| WO | 2019143982 A1 | 7/2019 |

OTHER PUBLICATIONS

Sophia Antipolis et al.,"UMTS, radio",3rd Generation Partnership Project;Technical Specification Group Radio Access Network;Evolved Universal Terrestrial Radio Access (E-UTRA);Medium Access Control (MAC) protocol specification (Release 13),3GPP TS 36.321 V13.2.0 (Jun. 2016),total:91pages.

ZTE, Sanechips et al.,"Coexistence between NR V2X and LTE V2X",3GPP TSG RAN WG1 Meeting #95 ,Spokane, USA, Nov. 12-16, 2018,R1-1813178,total:4pages.

Qualcomm Incorporated et al.,"Co-existence aspects for NR-V2X and LTE-V2X",3GPP TSG RAN WG1 Meeting #97, Reno, USA, May 13-17, 2019,R1-1907273,total:total:6pages.

Interdigital, Inc., "Discussion on In-device Coexistence between LTE and Nr V2X Sidelinks", 3GPP TSG RAN WGI #97 Reno, USA, May 13-17, 2019, R1-1907095, 5pages.

* cited by examiner

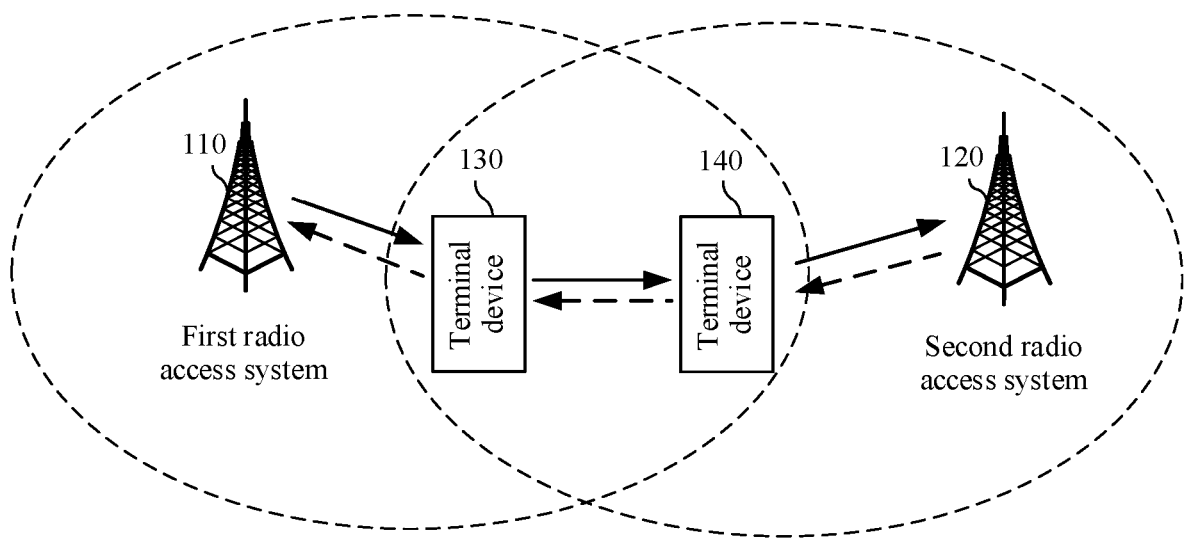

A terminal device determines information with a higher priority in first information associated with a first radio access system and second information associated with a second radio access system, where time domain resources associated with the first information and the second information are completely or partially the same, and the first information is data information and the second information is synchronization information, or the first information is synchronization information and the second information is synchronization information — S210

The terminal device sends or receives the information with the higher priority — S220

A terminal device determines that data information associated with a first radio access system needs to be sent or received on a first time domain resource, and synchronization information associated with a second radio access system needs to be sent or received on a second time domain resource, where the first time domain resource and the second time domain resource are completely or partially the same ⸺ S910

When a priority of the data information is higher than a first threshold, the terminal device sends or receives the data information; or when a priority of the data information is lower than or equal to a first threshold, the terminal device sends or receives the synchronization information ⸺ S920

FIG. 9

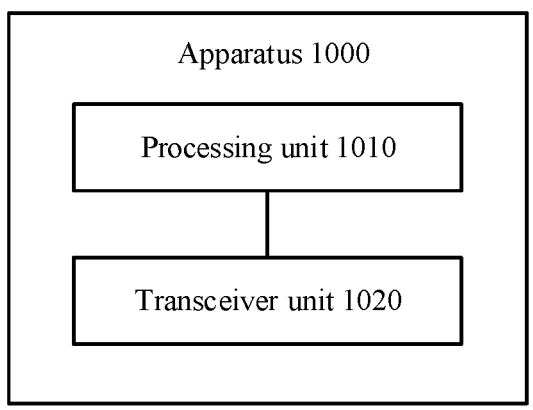

FIG. 10

INFORMATION TRANSMISSION METHOD AND APPARATUS

CROSS-REFERENCE TO RELATED APPLICATIONS

This application is a continuation of International Application No. PCT/CN2020/108382, field on Aug. 11, 2020, which claims priority to Chinese Patent Application No. 201910755198.7, filed on Aug. 15, 2019. The disclosures of the aforementioned applications are hereby incorporated by reference in their entireties.

TECHNICAL FIELD

This application relates to the communication field, and in particular, to an information transmission method and apparatus in the communication field.

BACKGROUND

In some communication systems, two different types of radio access systems may be both deployed, and devices are allowed to communicate with each other based on the two different types of radio access systems, so that radio resource utilization can be improved, a system handover delay can be reduced, and user and system performance can be improved. In other words, in the communication system, two types of network devices that support different radio access systems are both deployed. Similarly, a terminal device may support access to both of the two different types of network devices. For example, a long term evolution (LTE) system and a new radio (NR) system may be both deployed in the communication system. LTE-NR dual connectivity is a key technology for an operator to implement converged networking and flexible deployment scenarios of LTE and NR.

In the communication system in which two different types of radio access systems are deployed, time domain resources occupied by the terminal device to send/receive information in the two radio access systems may be the same. In this case, a conflict between resources for sending/receiving information is caused, and communication quality is reduced.

SUMMARY

This application provides an information transmission method and apparatus, to resolve a problem of a conflict between resources used by a terminal device to send/receive information in different radio access systems, ensure successful transmission of information with a high priority, and improve communication quality.

In at least some embodiments, an information transmission method is provided. The method includes: A terminal device determines information with a higher priority in first information associated with a first radio access system and second information associated with a second radio access system, where time domain resources associated with the first information and the second information are completely or partially the same, and the first information is data information and the second information is synchronization information, or the first information is synchronization information and the second information is synchronization information. The terminal device sends or receives the information with the higher priority.

According to the information transmission method in this embodiment of this application, the information with the higher priority in the first radio access system and the second radio access system is sent or received. This can resolve a problem of a conflict between resources used by the terminal device to send/receive information in different radio access systems, to avoid problems of increased interference and decreased communication quality that are caused by the conflict between resources. In addition, this ensures successful transmission of information with a high priority, and improves communication quality.

If the first information conflicts with the second information, the terminal device can send/receive only one of the first information and the second information on a time domain resource on which a conflict occurs. For example, the terminal device may select the information with the higher priority in the first information and the second information, and send or receive the information with the higher priority, but not send or receive the other piece of information with a lower priority, for example, discard the information with the lower priority.

In at least some embodiments, the first information is information that needs to be sent or received by the terminal device, and the second information is information that needs to be sent or received by the terminal device. In other words, the first information and the second information may be understood as to-be-sent information or to-be-received information, and have not been sent or received. Because the time domain resources completely or partially overlap, only one of the first information and the second information can be sent or received, and the other one of the first information and the second information cannot be sent or received.

In at least some embodiments, the first information is first data information and the second information is synchronization information. That a terminal device determines information with a higher priority in first information associated with a first radio access system and second information associated with a second radio access system includes: When a priority of the first data information is higher than a priority of second data information, the terminal device determines that the first data information is the information with the higher priority; or when a priority of the first data information is lower than or equal to a priority of second data information, the terminal device determines that the synchronization information is the information with the higher priority, where the second data information is data information that is last received or sent by the terminal device and associated with the second radio access system.

In this embodiment of this application, a priority of the synchronization information is associated with a priority of data information that is last sent or received in a radio access system corresponding to the synchronization information. This simplifies a priority processing manner, and facilitates implementation by the terminal device.

In an embodiment, that a terminal device determines information with a higher priority in first information associated with a first radio access system and second information associated with a second radio access system includes: If second data information associated with the second radio access system exists before the synchronization information is received or sent, the terminal device associates a priority of the synchronization information with a priority of the second data information.

In an embodiment, that a terminal device determines information with a higher priority in first information associated with a first radio access system and second information associated with a second radio access system includes: If the second data information associated with the second radio access system exists in a first time interval that is before a moment at which the synchronization information is received or sent, the terminal device associates the priority of the synchronization information with the priority of the second data information.

In an embodiment, that a terminal device determines information with a higher priority in first information associated with a first radio access system and second information associated with a second radio access system includes: If the second data information associated with the second radio access system exists before the synchronization information is received or sent, and the priority of the second data information is valid, the terminal device associates the priority of the synchronization information with the priority of the second data information.

It should be understood that "the priority of the second data information is valid" means that the priority of the second data information is valid in a second time interval that starts from a moment at which the second data information is sent or received. However, outside the second time interval, the priority of the second data information is invalid, and cannot be used to associate with the priority of the synchronization information. In other words, it is considered that the second data information that can be associated does not exist.

In an embodiment, when the second data information that can be associated exists, the terminal device may associate the priority of the synchronization information with the priority of the second data information. If the second data information that can be associated does not exist, the terminal device cannot determine, in the foregoing manner of associating the synchronization information with the second data information, information with a higher priority in priorities of the first data information and the synchronization information. In this case, the terminal device may determine the priority of the synchronization information in the following manner, and then compare the priority of the first data information and the priority of the synchronization information.

In an embodiment, the priority of the synchronization information may be predefined, preconfigured, associated with one or more of parameters such as a channel busy ratio (CBR), a channel occupancy ratio (CR), and quality of service (QoS), configured by using higher layer RRC or MAC signaling, or dynamically indicated by using physical layer signaling DCI or SCI. This is not limited in this embodiment of this application.

In at least some embodiments, the first information is first synchronization information and the second information is second synchronization information. That a terminal device determines information with a higher priority in first information associated with a first radio access system and second information associated with a second radio access system includes: When a priority of first data information is higher than a priority of second data information, the terminal device determines that the first synchronization information is the information with the higher priority; or when a priority of first data information is lower than or equal to a priority of second data information, the terminal device determines that the second synchronization information is the information with the higher priority, where the first data information is data information that is last received or sent by the terminal device and associated with the first radio access system, and the second data information is data information that is last received or sent by the terminal device and associated with the second radio access system.

In this embodiment of this application, a priority of the synchronization information is associated with a priority of data information that is last sent or received in a radio access system corresponding to the synchronization information. This simplifies a priority processing manner, and facilitates implementation by the terminal device.

In an embodiment, when first data information that can be associated exists, the terminal device may associate a priority of the first synchronization information with a priority of the first data information; and when second data information that can be associated exists, the terminal device may associate a priority of the second synchronization information with a priority of the second data information. If the first data information that can be associated, the second data information that can be associated, or both the first data information and second data information that can be associated does not exist, the terminal device cannot determine, in the foregoing manner of associating the first synchronization information with the first data information and associating the second synchronization information with the second data information, information with a higher priority in priorities of the first synchronization information and the second synchronization information. In this case, the terminal device may determine the priority of the first synchronization information and/or the priority of the second synchronization information in the following manner, and then compare the priority of the first synchronization information and the priority of the second synchronization information.

In at least some embodiments, the method further includes: The terminal device receives first indication information and second indication information, where the first indication information indicates the priority of the first data information, and the second indication information indicates the priority of the second data information. The terminal device determines information with a higher priority in the first data information and the second data information based on the first indication information and the second indication information.

In at least some embodiments, the terminal device may determine the information with the higher priority in the first data information and the second data information based on content in the first data information and the second data information. In an optional embodiment, when the first data information includes channel state information (CSI), or the first data information is sent/received together with a physical sidelink feedback channel (PSFCH), the priority of the first data information is higher than that of the second data information. On the contrary, when the second data information includes CSI, or the second data information is sent/received together with a PSFCH, the priority of the second data information is higher than that of the first data information.

According to the foregoing solutions, if information with a high priority is determined by implicit manner signaling overheads of the terminal device and transmission resources can be reduced, and processing flexibility of the terminal device can be improved according to this method; if information with a high priority is explicitly determined by explicit manner, a processing delay used by the terminal device to compare priorities can be reduced, a processing speed of the terminal device can be improved, and information transmission efficiency can be improved.

In at least some embodiments, at least one of a priority of the first information or a priority of the second information is predefined. Alternatively, at least one of a priority of the first information or a priority of the second information is determined based on a first parameter, where the first parameter is one or more of a channel busy ratio, a channel occupancy ratio, and quality of service. Alternatively, the method further includes: The terminal device receives third indication information and fourth indication information, where the third indication information indicates the priority of the first information, and the fourth indication information indicates the priority of the second information. That a terminal device determines information with a higher priority in first information associated with a first radio access system and second information associated with a second radio access system includes: The terminal device determines the information with the higher priority in the first information and the second information based on the third indication information and the fourth indication information.

In this embodiment of this application, if the predefined manner or the parameter-based determining manner is used, signaling overheads of the terminal device and transmission resources can be reduced; if the explicit indication manner using the indication information is used, a processing delay of the terminal device can be reduced, a processing speed of the terminal device can be improved, and information transmission efficiency can be improved.

In at least some embodiments, the first information is first synchronization information and the second information is second synchronization information. That a terminal device determines information with a higher priority in first information associated with a first radio access system and second information associated with a second radio access system includes: When a synchronization source of the first radio access system is the same as a synchronization source of the second radio access system, and a priority of a synchronization mode of the first radio access system is higher than a priority of a synchronization mode of the second radio access system, the terminal device determines that the first synchronization information is the information with the higher priority; or when a synchronization source of the first radio access system is different from a synchronization source of the second radio access system, and the synchronization source of the first radio access system is of a first type, the terminal device determines that the first synchronization information is the information with the higher priority, where the first type is a satellite, a network device, or a terminal.

Similarly, when a synchronization source of the first radio access system is the same as a synchronization source of the second radio access system, and a priority of a synchronization mode of the first radio access system is lower than or equal to a priority of a synchronization mode of the second radio access system, the terminal device determines that the second synchronization information is the information with the higher priority; or when a synchronization source of the first radio access system is different from a synchronization source of the second radio access system, and the synchronization source of the second radio access system is of a first type, the terminal device determines that the second synchronization information is the information with the higher priority, where the first type is a satellite, a network device, or a terminal.

For example, a type of a synchronization source of an NR system may be a global navigation satellite system (GNSS), a gNB, an eNB, UE, or the like; a type of a synchronization source of an LTE system may be a GNSS, an eNB, UE, or the like. Because the synchronization source and the synchronization mode are predefined or preconfigured, if the terminal device determines the information with the higher priority in the foregoing synchronization mode, no additional signaling is required for indication, and signaling overheads and transmission resources can be reduced.

In at least some embodiments, the first information is first synchronization information and the second information is second synchronization information. That a terminal device determines information with a higher priority in first information associated with a first radio access system and second information associated with a second radio access system includes: When the terminal device is in an out-of-synchronization state in the first radio access system, the terminal device determines that the first synchronization information is the information with the higher priority; or when the terminal device is in an out-of-synchronization state in the second radio access system, the terminal device determines that the second synchronization information is the information with the higher priority.

This is because information cannot be sent/received when the terminal device is in the out-of-synchronization state. Preferentially sending/receiving information associated with a radio access system in which the terminal device is in the out-of-synchronization state can help the terminal device be synchronized as soon as possible and normally send information.

In at least some embodiments, the first information is first synchronization information and the second information is second synchronization information, the first synchronization information needs to be sent or received once in a corresponding first synchronization information sending periodicity, and the second synchronization information needs to be sent or received for a plurality of times in a corresponding second synchronization information sending periodicity. That a terminal device determines information with a higher priority in first information associated with a first radio access system and second information associated with a second radio access system includes: The terminal device determines that the first synchronization information is the information with the higher priority.

The second synchronization information needs to be sent or received for a plurality of times in a periodicity for coverage. In this case, it is determined that the first synchronization information is the information with the higher priority, that is, the first synchronization information is sent on a time domain resource on which the first synchronization information conflicts with the second synchronization information, and the second synchronization information is not sent. In this way, a quantity of times of sending the second synchronization information is reduced, and a coverage loss is caused. However, the foregoing method can ensure transmission of the first synchronization information, that is, ensure successful transmission performed by the terminal device in the first radio access system. Although the coverage loss is caused because the quantity of times of sending the second synchronization information is reduced, it can still be ensured that the second synchronization information can be successfully received or sent within coverage, so that impact of a conflict can be reduced.

In an embodiment, in the foregoing embodiment, the terminal device may alternatively determine that the second synchronization information is the information with the higher priority. In this way, the second synchronization information can be repeatedly sent for a plurality of times in a periodicity, so that reliability of information transmission is ensured. It should be understood that if the second synchronization information is configured to be received or sent for a plurality of times in a periodicity, a reason is that reliability and a priority required by the second access system can be achieved only after the second synchronization information is sent for a plurality of times.

In at least some embodiments, the first information is data information and the second information is synchronization information. That a terminal device determines information with a higher priority in first information associated with a first radio access system and second information associated with a second radio access system includes: The terminal device determines that the synchronization information is the information with the higher priority; or when the data information includes channel state information CSI, or the data information is sent/received together with a physical sidelink feedback channel PSFCH, the terminal device determines that the data information is the information with the higher priority.

In this embodiment of this application, the synchronization information is preferentially sent/received. This can ensure that the terminal device is associated with the second access system to receive or send information, and can ensure successful transmission performed by the terminal device in the second access system.

However, the CSI is used to measure channel quality, RSRP is used to measure the channel quality or a path loss, HARQ information is used to allocate resources and determine whether to perform retransmission, and a DMRS is used for channel measurement or sending of some information. The PSFCH carries feedback information (for example, the CSI, the HARQ, and the RSRP), and these pieces of information are related to quality and resource allocation of next transmission. Therefore, these pieces of information need to be sent/received with a high priority. Therefore, if the data information includes the foregoing information, the terminal device may determine the data information as the information with the higher priority, to ensure that important information is preferentially sent/received, and help improve transmission quality and perform subsequent resource allocation.

In at least some embodiments, a time domain resource of the first information overlaps with time domain resources of at least two pieces of information associated with the second radio access system, the at least two pieces of information include the second information, and the second information is the first piece of information in time domain in the at least two pieces of information, or the second information is one of the at least two pieces of information; or a time domain resource of the second information overlaps with time domain resources of at least two pieces of information associated with the first radio access system, the at least two pieces of information include the first information, and the first information is the first piece of information in time domain in the at least two pieces of information, or the first information is one of the at least two pieces of information.

In an embodiment, the second information is the first piece of information in time domain in the at least two pieces of information associated with the second radio access system. In this way, comparison needs to be performed only once, that is, a priority of one piece of information associated with the first radio access system and a priority of one piece of information associated with the second radio access system are compared. This simplifies a processing procedure of the terminal device, improves a processing speed of the terminal device, helps reduce power consumption of the terminal device, and ensures relatively fast information transmission.

In an embodiment, the second information is information with a higher priority in the at least two pieces of information associated with the second radio access system. The terminal device may select one piece of information with the higher priority from the at least two pieces of information associated with the second radio access system, and then compare the piece of information with the first information. Alternatively, the terminal device may sequentially compare each of the at least two pieces of information associated with the second radio access system and the first information, to determine one piece of information with the higher priority. In this embodiment of this application, although comparison needs to be performed for a plurality of times, transmission of information with a high priority can be ensured, that is, more important information is preferentially sent/received, so that system performance is improved.

In at least some embodiments, processing time of the terminal device needs to be considered during information transmission, and the processing time may include priority decoding time and comparison time. The method further includes: The terminal device determines the priority of the first information and the priority of the second information before the processing time.

It is assumed that the processing time of the terminal device is one slot. In this case, if the terminal device has not obtained the priority of the first information and the priority of the second information one slot before an earlier slot in a slot corresponding to the first information and a slot corresponding to the second information, the terminal device may perform processing through implementation by the terminal device. This is not limited in this embodiment of this application.

In at least some embodiments, that the terminal device sends or receives the information with the higher priority includes: The terminal device sends or receives the information with the higher priority through a sidelink.

It should be understood that a link for sending or receiving the foregoing information is not limited in this embodiment of this application, and may be an uplink or a downlink between the terminal device and a network device, or may be a sidelink between terminal devices. The sidelink is a wireless direct communication link between the terminal device and another terminal device.

In at least some embodiments, the first radio access system is a long term evolution LTE system, and the second radio access system is a new radio NR system; or the first radio access system is an NR system, and the second radio access system is an LTE system.

In at least some embodiments, another information transmission method is provided. The method includes: A terminal device determines that data information associated with a first radio access system needs to be sent or received on a first time domain resource, and synchronization information associated with a second radio access system needs to be sent or received on a second time domain resource, where the first time domain resource and the second time domain resource are completely or partially the same. When a priority of the data information is higher than a first threshold, the terminal device sends or receives the data information; or when a priority of the data information is lower than or equal to a first threshold, the terminal device sends or receives the synchronization information.

In an embodiment, the information transmission method in this embodiment of this application may alternatively be described as follows. The method includes: The terminal device determines a first time domain resource used to send or receive data information associated with a first radio access system and a second time domain resource used to send or receive synchronization information associated with a second radio access system, where the first time domain resource and the second time domain resource are completely or partially the same. When a priority of the data information is higher than a first threshold, the terminal device sends or receives the data information on the first time domain resource; or when a priority of the data information is lower than or equal to a first threshold, the terminal device sends or receives the synchronization information on the second time domain resource.

According to the information transmission method in this embodiment of this application, information with a higher priority in the first radio access system and the second radio access system is sent or received. This can resolve a problem of a conflict between resources used by the terminal device to send/receive information in different radio access systems, to avoid problems of increased interference and decreased communication quality that are caused by the conflict between resources. In addition, this ensures successful transmission of information with a high priority, and improves communication quality.

In at least some embodiments, the priority of the data information is predefined. Alternatively, the method further includes: The terminal device receives first indication information, where the first indication information indicates the priority of the data information.

In at least some embodiments, the first threshold is predefined, or the first threshold is notified by a network device or another terminal device by using signaling.

In at least some embodiments, that the terminal device sends or receives the data information includes: The terminal device sends or receives the data information through a sidelink. Alternatively, that the terminal device sends or receives the synchronization information includes: The terminal device sends or receives the synchronization information through a sidelink.

In at least some embodiments, the first radio access system is a long term evolution LTE system, and the second radio access system is a new radio NR system; or the first radio access system is an NR system, and the second radio access system is an LTE system.

In at least some embodiments, an information transmission apparatus is provided. The apparatus is configured to perform the method according embodiments as described herein. For example, the apparatus may include a unit configured to perform the method according to embodiments as described herein.

In an embodiment, the apparatus may include modules that are in a one-to-one correspondence with the methods/operations/steps/actions according to embodiments as described herein. The module may be implemented by a hardware circuit, software, or a combination of a hardware circuit and software.

In another embodiment, the apparatus is a communication chip. The communication chip may include an input circuit or interface configured to send information or data, and an output circuit or interface configured to receive information or data.

In another embodiment, the apparatus is a communication device. The communication device may include a transmitter configured to send information or data, and a receiver configured to receive information or data.

In another embodiment, the apparatus is configured to perform the methods as described herein. The apparatus may be configured in the terminal device or network device, or the apparatus itself is the foregoing terminal device or network device.

In at least some embodiments, another information transmission apparatus is provided. The apparatus includes a processor and a memory. The memory is configured to store a computer program, and the processor is configured to invoke the computer program from the memory and run the computer program, to enable the communication apparatus to perform the method according to embodiments as described herein.

In an embodiment, there are one or more processors, and there are one or more memories.

In an embodiment, the memory may be integrated with the processor, or the memory and the processor are separately disposed.

In an embodiment, the apparatus further includes a transmitter and a receiver. The transmitter and the receiver may be separately disposed, or may be integrated together to obtain a transceiver.

In at least some embodiment, an information transmission system is provided. The system includes an apparatus configured to perform the methods according to embodiments as described herein.

In at least some embodiments, the system may further include another device that interacts with the terminal device in the solutions provided in the embodiments of this application.

In at least some embodiments, a computer program product is provided. The computer program product includes a computer program (or may be referred to as code or instructions). When the computer program is run, a computer is enabled to perform the methods according to embodiments as described herein.

In at least some embodiments, a computer-readable medium is provided. The computer-readable medium stores a computer program (or may be referred to as code or instructions). When the computer program is run on a computer, the computer is enabled to perform the methods according to embodiments as described herein.

In at least some embodiments, a communication apparatus is provided. The apparatus includes a memory and a processor. The communication apparatus may be, for example, a chip system. The memory is configured to store a computer program, and the processor is configured to invoke the computer program from the memory and run the computer program, to enable a communication device on which the communication apparatus is installed to perform the methods according to embodiments as described herein.

The chip system may include an input circuit or interface configured to output information or data, and an output circuit or interface configured to read information or data. The chip system may be a system on chip (SoC), may be a baseband chip, or the like. For example, the baseband chip may include a processor, a channel encoder, a digital signal processor, a modem, and an interface module.

BRIEF DESCRIPTION OF DRAWINGS

FIG. 1 is a schematic diagram of a communication system according to an embodiment of this application;

FIG. 2 is a schematic flowchart of an information transmission method according to an embodiment of this application;

FIG. 9 is a schematic flowchart of another information transmission method according to an embodiment of this application;

FIG. 10 is a schematic block diagram of an information transmission apparatus according to an embodiment of this application.

DETAILED DESCRIPTION OF EMBODIMENTS

Figure 3:
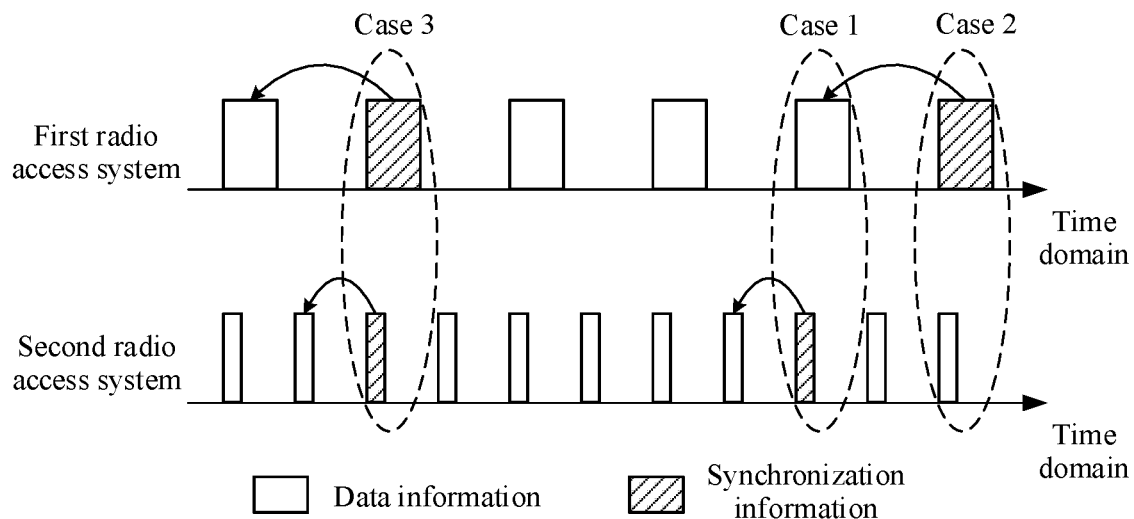
FIG. 3 is a schematic diagram of information distribution in time domain according to an embodiment of this application.

The following describes technical solutions in this application with reference to the accompanying drawings.

The technical solutions in embodiments of this application may be applied to a dual connectivity (DC) communication system. The dual connectivity communication system supports deployment of two different radio access systems, and allows devices to communicate with each other based on the two different radio access systems, so that radio resource utilization can be improved, a system handover delay can be reduced, and user and system performance can be improved. In the dual connectivity communication system, two types of network devices that support different radio access systems are both deployed. Similarly, a terminal device may support access to both of the two different types of network devices. Further, the technical solutions in the embodiments of this application may be applied to the internet of vehicles, for example, V2X, LTE-V, or V2V, or may be applied to fields such as intelligent driving and intelligent and connected vehicle.

The radio access system in the dual connectivity communication system may include but is not limited to the following systems: a long term evolution (LTE) system, an LTE frequency division duplex (FDD) system, an LTE time division duplex (TDD) system, a universal mobile telecommunication system (UMTS), a 5th generation (5G) system, a new radio (NR) system, or another evolved communication system. For example, a long term evolution (LTE) system and a new radio (NR) system may be both deployed in the dual connectivity communication system. This is not limited in the embodiments of this application.

A terminal device in the embodiments of this application may also be referred to as user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, some examples of the terminal are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (session initiation protocol, SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, or a terminal device in a future evolved public land mobile communication network (PLMN). This is not limited in the embodiments of this application.

By way of example, but not limitation, the terminal device in the embodiments of this application may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the terminal device in the embodiments of this application may alternatively be a terminal device in an internet of things (IoT) system. IoT is an important part of future development of information technologies. A main technical feature of the IoT is connecting a thing to a network by using a communication technology, to implement an intelligent network for interconnection between a person and a machine or between one thing and another. The terminal device in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement a method in this application. Therefore, the embodiments of this application may be applied to the internet of vehicles, for example, vehicle-to-everything (V2X), long term evolution-vehicle (LTE-V), and vehicle-to-vehicle (V2V).

In addition, a network device in the embodiments of this application may be a device configured to communicate with a terminal device. The network device may also be referred to as an access network device or a wireless access network device, and may be a transmission reception point (TRP), an evolved NodeB (eNB or eNodeB) in an LTE system, a home base station (for example, a home evolved NodeB or a home NodeB, HNB), a baseband unit (BBU), or a wireless controller in a cloud radio access network (CRAN) scenario. Alternatively, the network device may be a relay station, an access point, a vehicle-mounted device, a wearable device, a network device in a 5G network, a network device in a future evolved PLMN network, or the like; or may be an access point (AP) in a WLAN or a gNB in a new radio (NR) system. This is not limited in the embodiments of this application.

In a network structure, the network device may include a centralized unit (CU) node, a distributed unit (DU) node, a RAN device including a CU node and a DU node, or a RAN device including a control plane CU node (CU-CP node), a user plane CU node (CU-UP node), and a DU node.

The network device provides a cell with a service, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), or a memory (also referred to as a main memory). An operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in the embodiments of this application is not limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a functional module that is in the terminal device or the network device and that can invoke and execute the program.

In addition, aspects or features of this application may be implemented as a method, an apparatus, or a product using standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

For ease of understanding the embodiments of this application, a communication system applicable to the embodiments of this application is first described in detail with reference to FIG. 1.

FIG. 1 shows the communication system 100 to which the embodiments of this application are applied. As shown in FIG. 1, the communication system 100 may include a network device 110, a network device 120, a terminal device 130, and a terminal device 140.

The network device 110 supports a first radio access system, and the network device 120 supports a second radio access system. In other words, both the first radio access system and the second radio access system are deployed in the communication system 100. The terminal device 130 may support access to both the network device 110 and the network device 120. In other words, the terminal device 130 may perform uplink and downlink communication with the network device 110, and may also perform uplink and downlink communication with the network device 120. Similarly, the terminal device 140 may support access to both the network device 110 and the network device 120. In other words, the terminal device 140 may perform uplink and downlink communication with the network device 110, and may also perform uplink and downlink communication with the network device 120.

In the communication system 100, the terminal device 130 and the terminal device 140 may perform sidelink communication based on the first radio access system, and may also perform sidelink communication based on the second radio access system. The sidelink communication refers to direct wireless communication between terminal devices. That is, the terminal devices may directly perform wireless communication, instead of performing communication through a base station. Sidelink communication between the terminal device 130 and the terminal device 140 may also be referred to as device-to-device (D2D) communication. A main application of D2D communication is vehicle-to-everything (V2X) communication. V2X may include vehicle-to-vehicle (V2V), vehicle-to-pedestrian (V2P), vehicle-to-road side unit (V2R), vehicle-to-infrastructure (V21), vehicle-to-network (V2N), and the like.

It should be noted that, for ease of understanding, FIG. 1 shows only an example of two network devices and two terminal devices. In an embodiment, the communication system 100 may alternatively include another quantity of network devices, and another quantity of terminal devices may be included within coverage of each network device. This is not limited in the embodiments of this application.

In an embodiment, the communication system 100 may further include another network entity such as a network controller or a mobility management entity. The embodiments of this application are not limited thereto.

In the communication system 100, a time domain resource that needs to be occupied by the terminal device (for example, the terminal device 130) to send/receive information in the first radio access system and a time domain resource that needs to be occupied by the terminal device 130 to send/receive information in the second radio access system may be completely or partially the same. This causes a conflict between resources for sending/receiving information (also referred to as a conflict between pieces of information in this application). For example, information that needs to be sent by the terminal device and that is associated with the first radio access system conflicts with information that needs to be sent by the terminal device and that is associated with the second radio access system; information that needs to be sent by the terminal device and that is associated with the first radio access system conflicts with information that needs to be received by the terminal device and that is associated with the second radio access system; information that needs to be received by the terminal device and that is associated with the first radio access system conflicts with information that needs to be sent by the terminal device and that is associated with the second radio access system; or information that needs to be received by the terminal device and that is associated with the first radio access system conflicts with information that needs to be received by the terminal device and that is associated with the second radio access system.

For example, the first radio access system is an LTE system, and the second radio access system is an NR system. In an embodiment, the LTE system preconfigures a time-frequency resource used for information transmission, and information transmission is dynamically performed in the NR system based on a service requirement. In this way, a time-frequency resource required for sending/receiving information by the terminal device in the NR system completely or partially overlaps with a time domain resource required for sending/receiving information by the terminal device in the LTE system. This is also referred to as a conflict between resources for sending/receiving information or a conflict between pieces of information in this specification.

Therefore, currently, a method urgently needs to be provided, to resolve a problem of a conflict between resources used by a terminal device to send/receive information in different radio access systems.

For ease of understanding the embodiments of this application, the following descriptions are provided.

1. In the embodiments of this application, "used for indication" may include "used for direct indication" and "used for indirect indication", or may include "used for explicit indication" and "used for implicit indication". Information indicated by information is referred to as to-be-indicated information. In an embodiment, the to-be-indicated information may be indicated in a plurality of manners, for example, but not limited to, a manner of directly indicating the to-be-indicated information. For example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, it may alternatively be agreed on in advance (for example, defined in a protocol) that the to-be-indicated information is to be indicated depending on whether an information element exists, thereby reducing indication overheads to some extent.

2. In the following embodiments, "first", "second", "third", "fourth", and various numbers are merely used for differentiation for ease of description, but are not used to limit the scope of the embodiments of this application. For example, different pieces of information are differentiated, and different radio access systems are differentiated.

3. In the following embodiments, "pre-obtaining" may include being indicated by a network device by using signaling or being predefined, for example, being defined in a protocol. "Pre-definition" may be implemented by prestoring corresponding code or a corresponding table in a device (for example, including a terminal device and a network device), or in another manner that can be used to indicate related information. An embodiment is not limited in this application.

4. A "protocol" in the embodiments of this application may be a standard protocol in the communication field, for example, may include a long term evolution (LTE) protocol, a new radio (NR) protocol, and a related protocol applied to a future communication system. This is not limited in this application.

The following describes in detail the embodiments provided in this application.

FIG. 2 is a schematic flowchart of an information transmission method according to an embodiment of this application. The method 200 may be applied to the communication system 100 shown in FIG. 1. However, this embodiment of this application is not limited thereto.

S210: A terminal device determines information with a higher priority in first information associated with a first radio access system and second information associated with a second radio access system, where time domain resources associated with the first information and the second information are completely or partially the same, and the first information is data information and the second information is synchronization information, or the first information is synchronization information and the second information is synchronization information.

S220: The terminal device sends or receives the information with the higher priority.

According to the information transmission method in this embodiment of this application, the time domain resources that need to be occupied by the terminal device in the two radio access systems are completely or partially the same, and the terminal device sends or receives the information with the higher priority in the first radio access system and the second radio access system. This can resolve a problem of a conflict between resources used by the terminal device to send/receive information in different radio access systems, to avoid problems of increased interference and decreased communication quality that are caused by the conflict between resources. In addition, this ensures successful transmission of information with a high priority, and improves communication quality.

In this specification, that time domain resources associated with the first information and the second information are completely or partially the same may also be referred to as that time domain resources associated with the first information and the second information completely or partially overlap, or may be referred to as that the first information conflicts with the second information. This is not limited in this embodiment of this application.

If the first information conflicts with the second information, the terminal device can send/receive only one of the first information and the second information on a time domain resource on which a conflict occurs. For example, the terminal device may select the information with the higher priority in the first information and the second information, and send or receive the information with the higher priority, but not send or receive the other piece of information with a lower priority, for example, discard the information with the lower priority.

A priority of information indicates precedence of sending the information. In an embodiment, the priority may be explicitly indicated. For example, a value may be used to indicate the priority. For example, a smaller value indicates a lower priority, and a larger value indicates a higher priority. Alternatively, a smaller value indicates a higher priority, and a larger value indicates a lower priority. For example, the priority may be indicated in an enumeration manner. For example, an enumerated value low indicates a low priority, an enumerated value medium indicates a medium priority, and an enumerated value high indicates a high priority. In another embodiment, the priority may be implicitly determined. For example, priorities of pieces of information may be implicitly determined by comparing content in the pieces of information. In this case, a priority of the first information and/or a priority of the second information may not be clearly defined. However, it is determined, by comparing the first information and the second information, that the priority of the first information is higher than the priority of the second information or the priority of the first information is lower than the priority of the second information. An indication manner of the priority is not limited in this embodiment of this application.

It should be understood that, in this embodiment of this application, the terminal device may serve as a transmit end to send the first information or the second information, or may serve as a receive end to receive the first information or the second information. In view of different conflict generation scenarios, this embodiment of this application may include the following several cases:

1. For a terminal device, information that needs to be sent and that is associated with the first radio access system conflicts with information that needs to be sent and that is associated with the second radio access system, that is, the first information is information that needs to be sent by the terminal device, and the second information is information that needs to be sent by the terminal device. In this case, the terminal device sends the information with the higher priority in the first information and the second information, and does not send the other piece of information with the lower priority.

2. For a terminal device, information that needs to be sent and that is associated with the first radio access system conflicts with information that needs to be received and that is associated with the second radio access system, that is, the first information is information that needs to be sent by the terminal device, and the second information is information that needs to be received by the terminal device. In this case, if the priority of the first information is higher, the terminal device sends the first information and does not receive the second information; if the priority of the second information is higher, the terminal device receives the second information and does not send the first information.

3. For a terminal device, information that needs to be received and that is associated with the first radio access system conflicts with information that needs to be sent and that is associated with the second radio access system, that is, the first information is information that needs to be received by the terminal device, and the second information is information that needs to be sent by the terminal device. In this case, if the priority of the first information is higher, the terminal device receives the first information and does not send the second information; if the priority of the second information is higher, the terminal device sends the second information and does not receive the first information.

4. For a terminal device, information that needs to be received and that is associated with the first radio access system conflicts with information that needs to be received and that is associated with the second radio access system, that is, the first information is information that needs to be received by the terminal device, and the second information is information that needs to be received by the terminal device. In this case, the terminal device receives the information with the higher priority in the first information and the second information, and does not receive the other piece of information with the lower priority.

It should be understood that, when the terminal device serves as the transmit end, a receive end associated with the transmit end determines, in the same manner, to receive the information on the time domain resources that completely or partially overlap. Similarly, when the terminal device serves as the receive end, a transmit end associated with the receive end determines, in the same manner, to send the information on the time domain resources that completely or partially overlap. Details are not described again in this embodiment of this application.

The first information may be data information and the second information may be synchronization information, the first information may be synchronization information and the second information may be data information, or both the first information and the second information are synchronization information. This is not limited in this embodiment of this application.

It should be understood that the data information may be information carried on a physical sidelink shared channel (PSSCH), for example, data, channel state information (CSI), reference signal received power (RSRP), or hybrid automatic repeat request (HARD) information. Alternatively, the data information may include a channel or a signal that is multiplexed and sent with a PSSCH, for example, a sidelink feedback channel or a demodulation reference signal (DMRS). Alternatively, a PSSCH channel may also be referred to as data information. It should be noted that, because a sidelink control channel (physical sidelink control channel, PSCCH) and the PSSCH may be multiplexed in a plurality of manners (time-division multiplexed and/or frequency-division multiplexed), the data information may also include the PSCCH channel or information carried on the PSCCH. This is not limited in this embodiment of this application.

The synchronization information may be a sidelink synchronization signal (SLSS), and may be, for example, a sidelink synchronization signal block (S-SSB). The S-SSB may include a primary sidelink synchronization signal (PSSS), a secondary sidelink synchronization signal (SSSS), and a physical sidelink broadcast channel (PSBCH).

In an optional embodiment, the first information is information that needs to be sent or received by the terminal device, and the second information is information that needs to be sent or received by the terminal device. In other words, the first information and the second information may be understood as to-be-sent information or to-be-received information, and have not been sent or received. Because the time domain resources completely or partially overlap, only one of the first information and the second information can be sent or received, and the other one of the first information and the second information cannot be sent or received.

In this embodiment of this application, priority determining manners of different types of information are different, and the terminal device may determine the information with the higher priority in the first information and the second information in a plurality of manners. This is not limited in this embodiment of this application. The following describes in detail this embodiment of this application by using two different cases as examples.

Case 1: The first information is first data information and the second information is synchronization information.

In an embodiment, that a terminal device determines information with a higher priority in first information associated with a first radio access system and second information associated with a second radio access system includes: When a priority of the first data information is higher than a priority of second data information, the terminal device determines that the first data information is the information with the higher priority; or when a priority of the first data information is lower than or equal to a priority of second data information, the terminal device determines that the synchronization information is the information with the higher priority, where the second data information is data information that is last received or sent by the terminal device before the synchronization information and associated with the second radio access system.

For example, when the first information is data information and the second information is synchronization information, because the second information is associated with the second radio access system, the terminal device may determine, based on priorities of the first information and data information that is last received or sent in the second radio access system, which one of the first information and the second information has a higher priority, that is, associate a priority of the synchronization information in the second radio access system with a priority of the data information that is last sent or received in the second radio access system.

In this embodiment of this application, the priority of the synchronization information is associated with a priority of data information that is last sent or received in a radio access system corresponding to the synchronization information. This simplifies a priority processing manner, and facilitates implementation by the terminal device.

In an embodiment, the terminal device may compare the priority of the first data information and the priority of the second data information, and if the priority of the second data information is higher than the priority of the first data information, determine that a priority of the synchronization information is higher than the priority of the first data information. In another embodiment, the terminal device may determine the priority of the second data information as a priority of the synchronization information, and directly compare the priority of the first data information and the priority of the synchronization information.

In another embodiment, when second data information that can be associated exists, the terminal device may associate a priority of the synchronization information with a priority of the second data information.

In an optional embodiment, that a terminal device determines information with a higher priority in first information associated with a first radio access system and second information associated with a second radio access system includes: If the second data information associated with the second radio access system exists before the synchronization information is received or sent, the terminal device associates the priority of the synchronization information with the priority of the second data information.

In an optional embodiment, that a terminal device determines information with a higher priority in first information associated with a first radio access system and second information associated with a second radio access system includes: If the second data information associated with the second radio access system exists in a first time interval that is before a moment at which the synchronization information is received or sent, the terminal device associates the priority of the synchronization information with the priority of the second data information.

In an optional embodiment, that a terminal device determines information with a higher priority in first information associated with a first radio access system and second information associated with a second radio access system includes: If the second data information associated with the second radio access system exists before the synchronization information is received or sent, and the priority of the second data information is valid, the terminal device associates the priority of the synchronization information with the priority of the second data information.

It should be understood that "the priority of the second data information is valid" means that the priority of the second data information is valid in a second time interval that starts from a moment at which the second data information is sent or received. However, outside the second time interval, the priority of the second data information is invalid, and cannot be used to associate with the priority of the synchronization information. In other words, it is considered that the second data information that can be associated does not exist.

The foregoing "associating the priority of the synchronization information with the priority of the second data information" means that when the priority of the first data information is higher than the priority of the second data information, the terminal device determines that the first data information is the information with the higher priority; when the priority of the first data information is lower than or equal to the priority of the second data information, the terminal device determines that the synchronization information is the information with the higher priority.

The first time interval and/or the second time interval may be understood as valid time windows/a valid time window. For example, the first time interval and/or the second time interval may be predefined in a protocol. Alternatively, the first time interval and/or the second time interval may be determined based on one or more of parameters such as a channel busy ratio (CBR), a channel occupancy ratio (CR), quality of service (QoS) (for example, 5G quality of service (5G QoS Identifier, 5QI), a packet priority (prose per packet priority, PPPP), a priority, a latency, or reliability). Alternatively, the first time interval and/or the second time interval may be configured by a network device by using radio resource control (RRC) signaling or media access control (MAC) signaling. Alternatively, the first time interval and/or the second time interval may be dynamically indicated by using physical layer signaling (downlink control information (DCI) or sidelink control information (SCI)). This is not limited in this embodiment of this application.

If the second data information that can be associated does not exist, the terminal device cannot determine, in the foregoing manner of associating the synchronization information with the second data information, information with a higher priority in priorities of the first data information and the synchronization information. In this case, the terminal device may determine the priority of the synchronization information in the following manner, and then compare the priority of the first data information and the priority of the synchronization information.

In an optional embodiment, the priority of the synchronization information may be predefined, preconfigured, associated with one or more of parameters such as the CBR, the CR, and the QoS (the 5QI or the PPPP), configured by using higher layer RRC or MAC signaling, or dynamically indicated by using system information block (SIB) or physical layer signaling DCI or SCI. This is not limited in this embodiment of this application.

In an embodiment, the terminal device may directly determine the priority of the synchronization information in the foregoing manner. Alternatively, the terminal device may first determine whether the second data information that can be associated exists before the synchronization information is sent or received, and then determine the priority of the synchronization information in the foregoing manner when the second data information that can be associated does not exist. This is not limited in this embodiment of this application.

Case 2: The first information is first synchronization information and the second information is second synchronization information.

In an embodiment, that a terminal device determines information with a higher priority in first information associated with a first radio access system and second information associated with a second radio access system includes: When a priority of first data information is higher than a priority of second data information, the terminal device determines that the first synchronization information is the information with the higher priority; or when a priority of first data information is lower than or equal to a priority of second data information, the terminal device determines that the second synchronization information is the information with the higher priority, where the first data information is data information that is last received or sent by the terminal device before the first synchronization information and associated with the first radio access system, and the second data information is data information that is last received or sent by the terminal device before the second synchronization information and associated with the second radio access system.

For example, when the first information is synchronization information and the second information is also synchronization information, because the first information is associated with the first radio access system and the second information is associated with the second radio access system, the terminal device may determine, based on priorities of data information that is last received or sent in the first radio access system and data information that is last received or sent in the second radio access system, which one of the first information and the second information has a higher priority, that is, respectively associate a priority of the synchronization information in the first radio access system and a priority of the synchronization information in the second radio access system with a priority of the data information that is last sent or received in the first radio access system and a priority of the data information that is last sent or received in the second radio access system.

In this embodiment of this application, the priority of the synchronization information is associated with a priority of data information that is last sent or received in a radio access system corresponding to the synchronization information. This simplifies a priority processing manner, and facilitates implementation by the terminal device.

In an embodiment, the terminal device may compare the priority of the first data information and the priority of the second data information. If the priority of the first data information is higher than the priority of the second data information, the terminal device determines that a priority of the first synchronization information is higher than a priority of the second synchronization information. If the priority of the second data information is higher than the priority of the first data information, the terminal device determines that a priority of the second synchronization information is higher than a priority of the first synchronization information. In another embodiment, the terminal device may determine the priority of the first data information as a priority of the first synchronization information, determine the priority of the second data information as a priority of the second synchronization information, and directly compare the priority of the first synchronization information and the priority of the second synchronization information.

In another embodiment, when first data information that can be associated exists, the terminal device may associate a priority of the first synchronization information with a priority of the first data information; when second data information that can be associated exists, the terminal device may associate a priority of the second synchronization information with a priority of the second data information.

For a manner of "associating the priority of the second synchronization information with the priority of the second data information", refer to the foregoing case 1. Details are not described herein again. For a manner of "associating the priority of the first synchronization information with the priority of the first data information" and a manner of "associating the priority of the second synchronization information with the priority of the second data information", refer to the foregoing case 1. Details are not described herein again.

It should be understood that a time interval (a first time interval and/or a second time interval) used to determine whether the second data information that can be associated exists may be the same as or different from a time interval used to determine whether the first data information that can be associated exists. This is not limited in this embodiment of this application. When the time interval used to determine whether the second data information that can be associated exists is the same as the time interval used to determine whether the first data information that can be associated exists, the two types of time intervals may be configured by using same signaling, or may be separately configured. This is not limited in this embodiment of this application.

If the first data information that can be associated and/or the second data information that can be associated do/does not exist, the terminal device cannot determine, in the foregoing manner of associating the first synchronization information with the first data information and associating the second synchronization information with the second data information, information with a higher priority in priorities of the first synchronization information and the second synchronization information. In this case, the terminal device may determine the priority of the first synchronization information and/or the priority of the second synchronization information in the following manner, and then compare the priority of the first synchronization information and the priority of the second synchronization information.

In an embodiment, the priority of the first synchronization information and/or the priority of the second synchronization information may be predefined, preconfigured, associated with one or more of parameters such as the CBR, the CR, and the QoS (the 5QI or the PPPP), configured by using higher layer RRC or MAC signaling, or dynamically indicated by using system information (system information block, SIB) or physical layer signaling DCI or SCI. This is not limited in this embodiment of this application.

In an embodiment, the terminal device may directly determine the priority of the first synchronization information and the priority of the second synchronization information in the foregoing manner. Alternatively, the terminal device may first determine whether the first data information that can be associated exists before the first synchronization information is sent or received, and then determine the priority of the first synchronization information in the foregoing manner when the first data information that can be associated does not exist; and/or first determine whether the second data information that can be associated exists before the second synchronization information is sent or received, and then determine the priority of the second synchronization information in the foregoing manner when the second data information that can be associated does not exist. This is not limited in this embodiment of this application.

FIG. 3 is a schematic diagram of information distribution in time domain according to an embodiment of this application. FIG. 3 includes three cases in which data information conflicts with synchronization information. In a case 1, data information of a first radio access system conflicts with synchronization information of a second radio access system. In this case, a terminal device may associate a priority of the synchronization information of the second radio access system with a priority of a previous piece of data information of the synchronization information (as shown by an arrow in the figure), and directly compare the priority of the previous piece of data information with a priority of the data information of the first radio access system. Similarly, in a case 2, synchronization information of the first radio access system conflicts with data information of the second radio access system. In this case, the terminal device may associate a priority of the synchronization information of the first radio access system with a priority of a previous piece of data information of the synchronization information (as shown by an arrow in the figure), and directly compare the priority of the previous piece of data information with a priority of the data information of the second radio access system. In a case 3, synchronization information of the first radio access system conflicts with synchronization information of the second radio access system. In this case, the terminal device may associate a priority of the synchronization information of the first radio access system with a priority of a previous piece of data information of the synchronization information (as shown by an arrow in the figure), associate a priority of the synchronization information of the second radio access system with a priority of a previous piece of data information of the synchronization information (as shown by an arrow in the figure), and directly compare the priority of the previous piece of data information associated with the first radio access system and the priority of the previous piece of data information associated with the second radio access system.

It should be understood that the terminal device may determine the priority of the first data information and the priority of the second data information in a plurality of manners. This is not limited in this embodiment of this application.

In an embodiment, the priority of the first data information and the priority of the second data information may be implicitly determined. For example, the terminal device may determine information with a higher priority in the first data information and the second data information based on content in the first data information and the second data information. In an optional embodiment, when the first data information includes channel state information (CSI), RSRP, HARQ information, and/or a DMRS, or when the first data information is sent/received together with a physical sidelink feedback channel (PSFCH), the priority of the first data information is higher than that of the second data information. On the contrary, when the second data information includes CSI, RSRP, and/or HARQ information, or when the second data information is sent/received together with a PSFCH, the priority of the second data information is higher than that of the first data information.

In another embodiment, the terminal device may explicitly determine the priority of the first data information and the priority of the second data information. In an optional embodiment, the method further includes: The terminal device receives first indication information and second indication information, where the first indication information indicates the priority of the first data information, and the second indication information indicates the priority of the second data information. The terminal device determines the information with the higher priority in the first data information and the second data information based on the first indication information and the second indication information.

According to the foregoing solutions, if information with a high priority is implicitly determined, signaling overheads of the terminal device and transmission resources can be reduced, and processing flexibility of the terminal device can be improved according to this method; if information with a high priority is explicitly determined, a processing delay used by the terminal device to compare priorities can be reduced, a processing speed of the terminal device can be improved, and information transmission efficiency can be improved.

It should be understood that the first indication information and the second indication information may be sent by the network device or another terminal device to the terminal device by using physical layer signaling or higher layer signaling. The foregoing signaling may be DCI, SCI, RRC signaling, an SIB, or MAC signaling. This is not limited in this embodiment of this application.

It should be further understood that the first indication information and the second indication information may be sent by using two different messages, or may be sent by using two different fields in a same message. This is not limited in this embodiment of this application.

This embodiment of this application further provides a method for explicitly determining the priority of the first information and the priority of the second information, that is, the priority of the first information and the priority of the second information are separately indicated by using explicit information.

In an embodiment, the priority of the first information and/or the priority of the second information are/is predefined. Alternatively, the priority of the first information and/or the priority of the second information are/is determined based on a first parameter, where the first parameter is one or more of a channel busy ratio CBR, a channel occupancy ratio CR, and quality of service QoS (for example, a 5QI, a PPPP, a latency, or reliability). Alternatively, the method further includes: The terminal device receives third indication information and fourth indication information, where the third indication information indicates the priority of the first information, and the fourth indication information indicates the priority of the second information. That a terminal device determines information with a higher priority in first information associated with a first radio access system and second information associated with a second radio access system includes: The terminal device determines the information with the higher priority in the first information and the second information based on the third indication information and the fourth indication information.

For example, similar to the first indication information and the second indication information, the third indication information and the fourth indication information may be sent by the network device or the another terminal device to the terminal device by using physical layer signaling (DCI or SCI) or higher layer signaling (RRC or MAC signaling). In addition, the third indication information and the fourth indication information may be sent by using two different messages, or may be sent by using two different fields in a same message. This is not limited in this embodiment of this application.

In this embodiment of this application, if the predefined manner or the parameter-based determining manner is used, signaling overheads of the terminal device and transmission resources can be reduced; if the explicit indication manner using the indication information is used, a processing delay of the terminal device can be reduced, a processing speed of the terminal device can be improved, and information transmission efficiency can be improved.

It should be understood that the explicit indication manner is more applicable to a scenario in which data information conflicts with synchronization information, or a scenario in which when synchronization information conflicts with synchronization information, no previous piece of data information that can be associated exists in a radio access system associated with the synchronization information. However, the explicit indication manner in this embodiment is still applicable to another scenario, and this is not limited.

Figure 4:
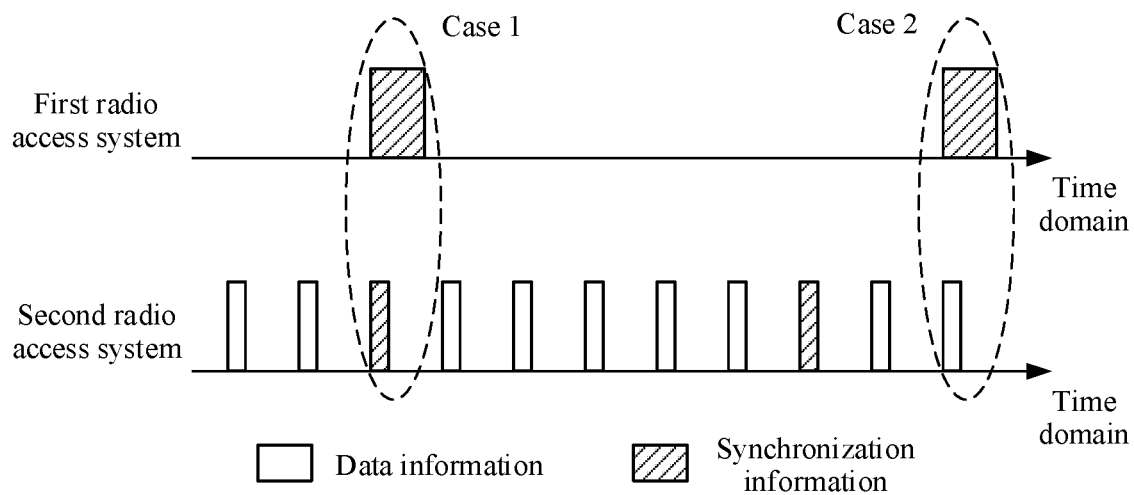
FIG. 4 is another schematic diagram of information distribution in time domain according to an embodiment of this application.
Figure 5:
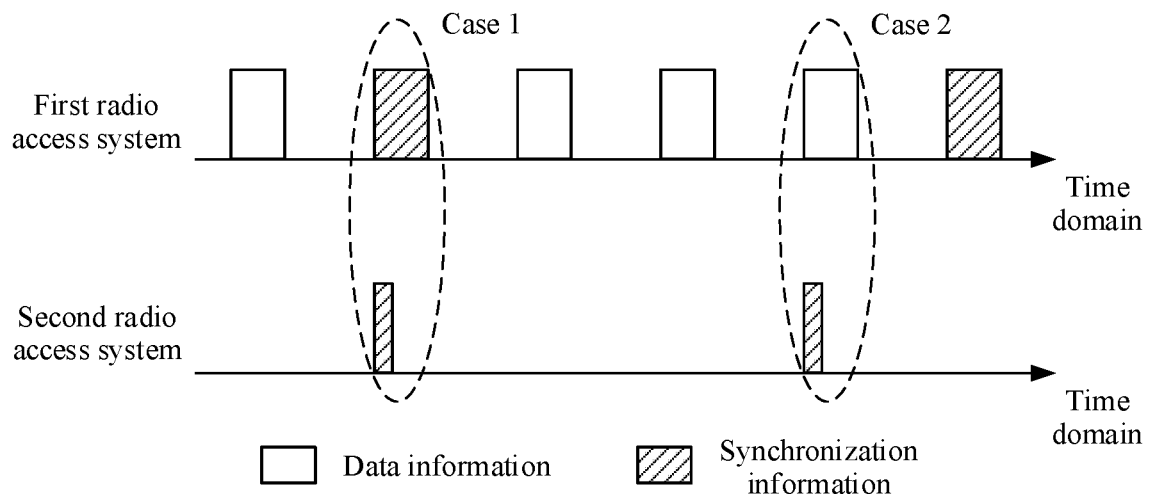
FIG. 5 is another schematic diagram of information distribution in time domain according to an embodiment of this application.

FIG. 4 and FIG. 5 are another two schematic diagrams of information distribution in time domain according to embodiments of this application. In FIG. 4, in a case 1, synchronization information of a first radio access system conflicts with synchronization information of a second radio access system; in a case 2, synchronization information of the first radio access system conflicts with data information of the second radio access system. The synchronization information of the first radio access system has no data information that can be associated. In FIG. 5, in a case 1, synchronization information of a first radio access system conflicts with synchronization information of a second radio access system; in a case 2, synchronization information of the first radio access system conflicts with data information of the second radio access system. The synchronization information of the second radio access system has no data information that can be associated. For the plurality of cases shown in FIG. 4 and FIG. 5, the information with the higher priority may be determined in the first information and the second information in the foregoing explicit indication manner.

In an optional embodiment, the first information is first synchronization information and the second information is second synchronization information. That a terminal device determines information with a higher priority in first information associated with a first radio access system and second information associated with a second radio access system includes: When a synchronization source of the first radio access system is the same as a synchronization source of the second radio access system, and a priority of a synchronization mode of the first radio access system is higher than a priority of a synchronization mode of the second radio access system, the terminal device determines that the first synchronization information is the information with the higher priority; when a synchronization source of the first radio access system is the same as a synchronization source of the second radio access system, and a priority of a synchronization mode of the first radio access system is lower than or equal to a priority of a synchronization mode of the second radio access system, the terminal device determines that the second synchronization information is the information with the higher priority; when a synchronization source of the first radio access system is different from a synchronization source of the second radio access system, and the synchronization source of the first radio access system is of a first type, the terminal device determines that the first synchronization information is the information with the higher priority; or when a synchronization source of the first radio access system is different from a synchronization source of the second radio access system, and the synchronization source of the second radio access system is of a first type, the terminal device determines that the second synchronization information is the information with the higher priority, where the first type is a satellite, a network device, or a terminal.

Considering that a radio access system has different synchronization sources and different synchronization modes, the terminal device may determine priorities of the first synchronization information and the second synchronization information based on the synchronization source and the synchronization mode. For example, a type of a synchronization source of an NR system may be a global navigation satellite system (GNSS), a gNB, an eNB, UE, or the like; a type of a synchronization source of an LTE system may be a GNSS, an eNB, UE, or the like.

Different synchronization sources and different synchronization modes may correspond to different priorities. For example, the following Table 1 lists priorities of a plurality of synchronization modes of an NR system whose synchronization source is a GNSS, Table 2 lists priorities of a plurality of synchronization modes of an NR system whose synchronization source is a gNB/an eNB or a GNSS, and Table 3 lists priorities of a plurality of synchronization modes of an LTE system whose synchronization source is a gNB/an eNB or a GNSS.

TABLE 1

| Priority | Synchronization mode |
|---|---|
| P0 | GNSS |
| P1 | UE directly synchronized to the GNSS |
| P2 | UE indirectly synchronized to the GNSS |
| P3 | Remaining UE having the lowest priority |

TABLE 2

| Priority | Synchronization mode |
|---|---|
| P0 | gNB/eNB |
| P1 | UE directly synchronized to the gNB/eNB |
| P2 | UE indirectly synchronized to the gNB/eNB |
| P3 | GNSS |
| P4 | UE directly synchronized to the GNSS |
| P5 | UE indirectly synchronized to the GNSS |
| P6 | Remaining UE having the lowest priority |

TABLE 3

| Priority | Synchronization mode |
|---|---|
| P1 | GNSS |
| P2 | UE directly synchronized to the GNSS and UE directly synchronized to the eNB |
| P3 | UE indirectly synchronized to the GNSS and UE indirectly synchronized to the eNB |
| P4 | Remaining UE having the lowest priority |

The priorities are represented by P0 to P6. For example, P0 corresponds to the highest priority, and priorities corresponding to subsequent P1 to P6 sequentially decrease.

Table 1 and Table 2 each correspond to an NR system. During actual application, either of Table 1 or Table 2 may be used in a predefined or configured manner. For example, if a GNSS is configured as a synchronization source, Table 1 is correspondingly used. In this case, a priority of direct synchronization to the GNSS is higher than a priority of indirect synchronization to the GNSS. If a gNB/an eNB or a GNSS is configured as a synchronization source, Table 2 is correspondingly used. In this case, a priority of direct synchronization to the gNB/eNB is higher than a priority of indirect synchronization to the gNB/eNB, the priority of indirect synchronization to the gNB/eNB is higher than a priority of direct synchronization to the GNSS, and the priority of direct synchronization to the GNSS is higher than a priority of indirect synchronization to the GNSS. Table 3 corresponds to an LTE system. More specifically, in the LTE system, a priority of direct synchronization to a GNSS is equal to a priority of direct synchronization to a gNB/an eNB, a priority of indirect synchronization to the GNSS is equal to a priority of indirect synchronization to the gNB/eNB, and the priority of direct synchronization is higher than the priority of indirect synchronization.

It should be understood that direct synchronization means that synchronization can be implemented through only one hop, and indirect synchronization means that synchronization needs to be implemented through a plurality of hops. In this embodiment of this application, for a same synchronization source, a priority of direct synchronization is higher than a priority of indirect synchronization. For example, if a synchronization source of the first synchronization information and a synchronization source of the second synchronization information are both GNSSs, a synchronization mode of the first synchronization information is direct synchronization, and a synchronization mode of the second synchronization information is indirect synchronization, a priority of the first synchronization information is higher than a priority of the second synchronization information.

In an embodiment, if the synchronization source of the first radio access system is the same as the synchronization source of the second radio access system, the terminal device may compare the priority associated with the synchronization mode of the first radio access system and the priority associated with the synchronization mode of the second radio access system, to determine the priority of the first synchronization information and the priority of the second synchronization information. For example, the first radio access system is an NR system and has a synchronization mode of direct synchronization to a GNSS, and the second radio access system is an LTE system and has a synchronization mode of indirect synchronization to a GNSS. Because a priority of direct synchronization to the GNSS is higher than a priority of indirect synchronization to the GNSS, the terminal device may determine that the priority of the first synchronization information of the first radio access system is higher than the priority of the second synchronization information of the second radio access system.

In another embodiment, if the synchronization source of the first radio access system is different from the synchronization source of the second radio access system, the terminal device may directly determine, as the information with the higher priority, synchronization information associated with a radio access system whose synchronization source is of the first type. The first type may be a GNSS, a gNB, an eNB, or UE. This is not limited in this embodiment of this application.

In another embodiment, if the synchronization source of the first radio access system is the same as the synchronization source of the second radio access system, and synchronization modes are the same, the terminal device may preferentially send/receive synchronization information of a radio access system in the two radio access systems. The radio access system may be agreed in a protocol, configured by the network device or the another terminal device for the terminal device by using signaling, or determined by the terminal device through internal implementation. For example, the radio access system may be an LTE system.

In an optional embodiment, the first information is first synchronization information and the second information is second synchronization information. That a terminal device determines information with a higher priority in first information associated with a first radio access system and second information associated with a second radio access system includes: When the terminal device is in an out-of-synchronization state in the first radio access system, the terminal device determines that the first synchronization information is the information with the higher priority; or when the terminal device is in an out-of-synchronization state in the second radio access system, the terminal device determines that the second synchronization information is the information with the higher priority.

For example, the terminal device may preferentially send/receive information associated with a radio access system in which the terminal device is in the out-of-synchronization state. This is because information cannot be sent/received when the terminal device is in the out-of-synchronization state. Preferentially sending/receiving the information associated with the radio access system in which the terminal device is in the out-of-synchronization state can help the terminal device be synchronized as soon as possible and normally send information.

In an optional embodiment, the first information is first synchronization information and the second information is second synchronization information, the first synchronization information needs to be sent or received once in a corresponding first synchronization information sending periodicity, and the second synchronization information needs to be sent or received for a plurality of times in a corresponding second synchronization information sending periodicity. That a terminal device determines information with a higher priority in first information associated with a first radio access system and second information associated with a second radio access system includes: The terminal device determines that the first synchronization information is the information with the higher priority.

For example, the first synchronization information may be sent or received in the first synchronization information sending periodicity, and the second synchronization information may be sent or received in the second synchronization information sending periodicity. The first synchronization information sending periodicity and the second synchronization information sending periodicity are separately configured, and periodicity lengths may be the same or different. This is not limited in this embodiment of this application.

The second synchronization information needs to be sent or received for a plurality of times in a periodicity for coverage. In this case, it is determined that the first synchronization information is the information with the higher priority, that is, the first synchronization information is sent on a time domain resource on which the first synchronization information conflicts with the second synchronization information, and the second synchronization information is not sent. In this way, a quantity of times of sending the second synchronization information is reduced, and a coverage loss is caused. However, the foregoing method can ensure transmission of the first synchronization information, that is, ensure successful transmission performed by the terminal device in the first radio access system. Although the coverage loss is caused because the quantity of times of sending the second synchronization information is reduced, it can still be ensured that the second synchronization information can be successfully received or sent within coverage, so that impact of a conflict can be reduced.

For example, the first radio access system is an LTE system, the first synchronization information is a sidelink synchronization signal SLSS, the second radio access system is an NR system, the second synchronization information is an S-SSB, and the S-SSB needs to be sent for a plurality of times in a sending periodicity, that is, S-SSB repetition. In this case, the terminal device may send the SLSS of the LTE system.

In an embodiment, in the foregoing embodiment, the terminal device may alternatively determine that the second synchronization information is the information with the higher priority. In this way, the second synchronization information can be repeatedly sent for a plurality of times in a periodicity, so that reliability of information transmission is ensured. It should be understood that if the second synchronization information is configured to be received or sent for a plurality of times in a periodicity, a reason is that reliability, a priority, and coverage required by the second radio access system can be achieved only after the second synchronization information is sent for a plurality of times.

In an optional embodiment, the first information is data information and the second information is synchronization information. That a terminal device determines information with a higher priority in first information associated with a first radio access system and second information associated with a second radio access system includes: The terminal device determines that the synchronization information is the information with the higher priority; or when the data information includes one or more of channel state information (CSI), reference signal received power (RSRP), hybrid automatic repeat request (HARQ) information, and a demodulation reference signal (DMRS), or the data information is sent/received together with a physical sidelink feedback channel PSFCH, the terminal device determines that the data information is the information with the higher priority.

For example, when the first information is the data information and the second information is the synchronization information, the terminal device may directly determine that the synchronization information has a higher priority.

In this way, the synchronization information is preferentially sent/received. This can ensure that the terminal device is associated with the second access system to receive or send information, and can ensure successful transmission performed by the terminal device in the second access system.

For example, when the first information is the data information and the second information is the synchronization information, the terminal device may first determine whether the data information includes the CSI, the RSRP, the HARQ information, and/or the DMRS, or whether the data information is sent/received together with the PSFCH. When the data information includes the CSI, the RSRP, the HARQ information, and/or the DMRS, or the data information is sent/received together with the PSFCH, the terminal device may determine that the data information has a higher priority.

The CSI is used to measure channel quality, the RSRP is used to measure the channel quality or a path loss, the HARQ information is used to allocate resources and determine whether to perform retransmission, and the DMRS is used for channel measurement or sending of some information. The PSFCH carries feedback information (for example, the CSI, the HARQ, and the RSRP), and these pieces of information are related to quality and resource allocation of next transmission. Therefore, these pieces of information need to be sent/received with a high priority. Therefore, if the data information includes the foregoing information, the terminal device may determine the data information as the information with the higher priority, to ensure that important information is preferentially sent/received, and help improve transmission quality and perform subsequent resource allocation.

In an optional embodiment, a time domain resource of the first information overlaps with time domain resources of at least two pieces of information associated with the second radio access system, the at least two pieces of information include the second information, and the second information is the first piece of information in time domain in the at least two pieces of information, or the second information is one of the at least two pieces of information; or a time domain resource of the second information overlaps with time domain resources of at least two pieces of information associated with the first radio access system, the at least two pieces of information include the first information, and the first information is the first piece of information in time domain in the at least two pieces of information, or the first information is one of the at least two pieces of information.

Considering that a subcarrier spacing of the first radio access system may be different from a subcarrier spacing of the second radio access system, one slot of the first radio access system may correspond to a plurality of slots of the second radio access system, or one slot of the second radio access system may correspond to a plurality of slots of the first radio access system.

For ease of description, the foregoing time domain unit comprised in time domain resource is referred to as a slot in this specification. However, it should be understood that the slot in this embodiment of this application may alternatively be replaced with a mini-slot (mini-slot), a subframe, or at least one orthogonal frequency division multiplexing (OFDM) symbol. This is not limited in this embodiment of this application.

Figure 6:
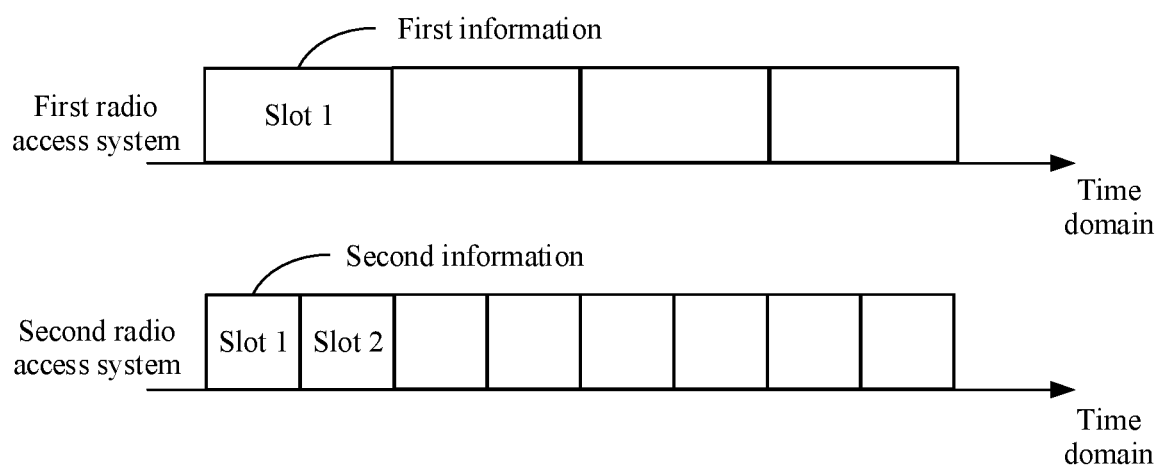
FIG. 6 is another schematic diagram of information distribution in time domain according to an embodiment of this application.

For example, the subcarrier spacing of the first radio access system is 15 kHz, and the subcarrier spacing of the second radio access system is 30 kHz. In this case, one slot of the first radio access system may correspond to two slots of the second radio access system, as shown in FIG. 6. For example, a slot 1 of the first radio access system overlaps with a slot 1 and a slot 2 of the second radio access system. The slot 1 of the first radio access system is used to send/receive the first information, the slot 1 of the second radio access system is used to send/receive the second information, and the slot 2 of the second radio access system is used to send/receive another piece of information.

In an embodiment, the second information is the first piece of information in time domain in the at least two pieces of information associated with the second radio access system. For example, the terminal device may directly determine priorities of the first information associated with the slot 1 of the first radio access system and the second information associated with the slot 1 of the second radio access system. If the priority of the first information is higher, the terminal device sends or receives the first information in the slot 1 of the first radio access system. If the priority of the second information is higher, the terminal device sends or receives the second information in the slot 1 of the second radio access system, and sends or receives, in the slot 2 of the second radio access system, the another piece of information associated with the slot 2. In this way, comparison needs to be performed only once, that is, a priority of one piece of information associated with the first radio access system and a priority of one piece of information associated with the second radio access system are compared. This simplifies a processing procedure of the terminal device, improves a processing speed of the terminal device, helps reduce power consumption of the terminal device, and ensures relatively fast information transmission.

In an embodiment, the second information is information with a higher priority in the at least two pieces of information associated with the second radio access system. The terminal device may select one piece of information with the higher priority from the at least two pieces of information associated with the second radio access system, and then compare the piece of information with the first information. Alternatively, the terminal device may sequentially compare each of the at least two pieces of information associated with the second radio access system and the first information, to determine one piece of information with the higher priority. For example, the terminal device may determine priorities of the first information associated with the slot 1 of the first radio access system and the information associated with the slot 1 of the second radio access system, and priorities of the first information associated with the slot 1 of the first radio access system and the information associated with the slot 2 of the second radio access system. If the priority of the first information is the highest (that is, higher than the priority of the information associated with the slot 1 of the second radio access system and a priority of the information associated with the slot 2 of the second radio access system), the terminal device sends or receives the first information in the slot 1 of the first radio access system. If the priority of the first information is not the highest, the terminal device sends or receives, in the slot 1 of the second radio access system, the information associated with the slot 1, and sends or receives, in the slot 2 of the second radio access system, the information associated with the slot 2. In this embodiment of this application, although comparison needs to be performed for a plurality of times, transmission of information with a high priority can be ensured, that is, more important information is preferentially sent/received, so that system performance is improved.

Figure 7:
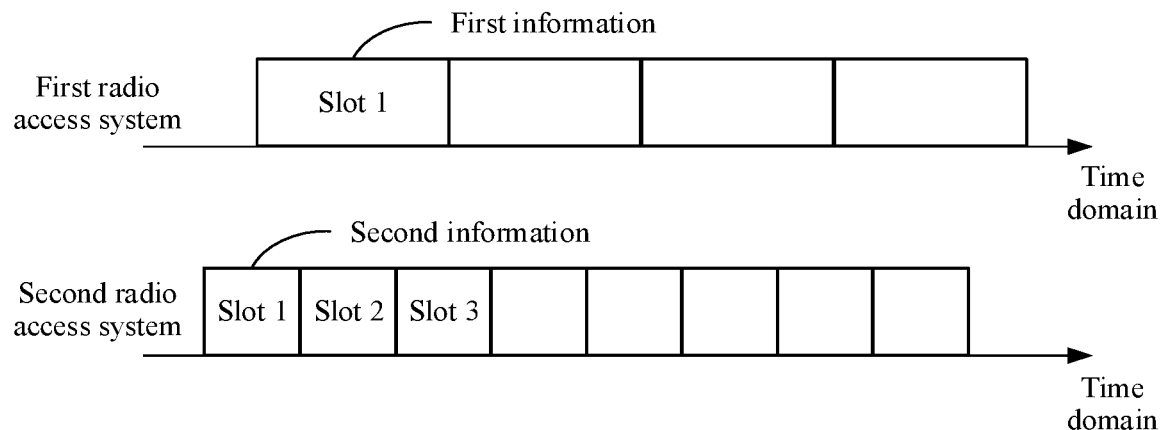
FIG. 7 is another schematic diagram of information distribution in time domain according to an embodiment of this application.

For example, a subcarrier spacing of the first radio access system is 15 kHz, a subcarrier spacing of the second radio access system is 30 kHz, and the terminal device is in an out-of-synchronization state after being associated with the first radio access system and the second radio access system or a timing difference exists. In this case, one slot of the first radio access system may correspond to three slots of the second radio access system, as shown in FIG. 7. For example, a slot 1 of the first radio access system overlaps with a slot 1, a slot 2, and a slot 3 of the second radio access system. The slot 1 of the first radio access system is used to send/receive the first information, the slot 1 of the second radio access system is used to send/receive the second information, and the slot 2 and the slot 3 of the second radio access system are used to send/receive other pieces of information. The information transmission method in this embodiment is the same as that in FIG. 6, and details are not described herein again.

Figure 8:
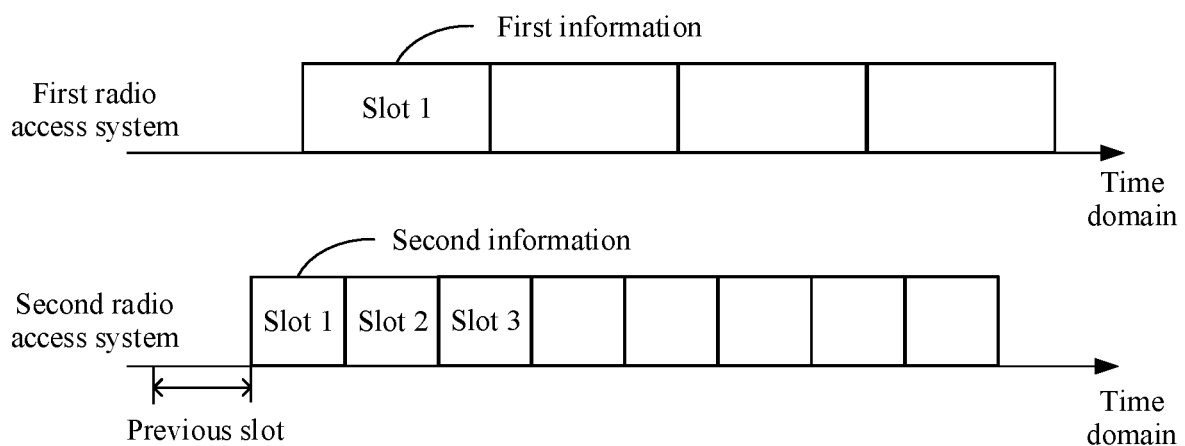
FIG. 8 is another schematic diagram of information distribution in time domain according to an embodiment of this application.

In an optional embodiment, processing time of the terminal device needs to be considered during information transmission, and the processing time may include priority decoding time and comparison time. It is assumed that the processing time of the terminal device is one slot. In this case, if the terminal device has not obtained the priority of the first information and the priority of the second information one slot before an earlier slot in a slot corresponding to the first information and a slot corresponding to the second information, the terminal device may perform processing through implementation by the terminal device. This is not limited in this embodiment of this application. As shown in FIG. 8, a slot 1 of the second radio access system is earlier than a slot 1 of the first radio access system. Therefore, the terminal device needs to determine the priority of the first information and the priority of the second information one slot before the slot 1 of the second radio access system.

It should be understood that the foregoing describes only a case in which one slot of the first radio access system corresponds to a plurality of slots of the second radio access system. A case in which one slot of the second radio access system corresponds to a plurality of slots of the first radio access system is similar, and details are not described herein again.

For example, the first radio access system is an LTE system, and the second radio access system is an NR system. The following describes several cases by using examples.

1. A slot 1 of the LTE system is used to send/receive an SLSS, a slot 1 of the NR system is used to send/receive data information, and a slot 2 of the NR system is used to send/receive an S-SSB.

In an embodiment, a priority of the SLSS of the LTE system is higher than a priority of the data information of the NR system. In this case, the terminal device sends or receives the SLSS of the LTE system. In an embodiment, a priority of the SLSS of the LTE system is higher than a priority of the data information of the NR system, but a priority of the S-SBB of the NR system is higher than the priority of the SLSS of the LTE system. In this case, the terminal device sends or receives the data information and the S-SBB of the NR system.

2. A slot 1 of the LTE system is used to send/receive data information, a slot 1 of the NR system is used to send/receive data information, and a slot 2 of the NR system is used to send/receive an S-SBB.

In an embodiment, a priority of the data information of the LTE system is higher than a priority of the data information of the NR system. In this case, the terminal device sends or receives the data information of the LTE system. In an embodiment, a priority of the data information of the LTE system is higher than a priority of the data information of the NR system, but a priority of the S-SBB of the NR system is higher than the priority of the data information of the LTE system. In this case, the terminal device sends or receives the data information and the S-SBB of the NR system.

3. A slot 1 of the LTE system is used to send/receive data information, a slot 1 of the NR system is used to send/receive data information (send/receive the data information together with a PSFCH), and a slot 2 of the NR system is used to send/receive an S-SBB.

In an embodiment, a priority of the data information of the NR system is higher than a priority of the data information of the LTE system. In this case, the terminal device sends or receives the data information and the S-SBB of the NR system. In an embodiment, a priority of the data information of the NR system is higher than a priority of the data information of the LTE system, and a priority of the S-SBB of the NR system is higher than the priority of the data information of the LTE system. In this case, the terminal device sends or receives the data information and the S-SBB of the NR system.

In an optional embodiment, that the terminal device sends or receives the information with the higher priority includes:

The terminal device sends or receives the information with the higher priority through a sidelink.

It should be understood that a link for sending or receiving the foregoing information is not limited in this embodiment of this application, and may be an uplink or a downlink between the terminal device and the network device, or may be a sidelink between terminal devices. The sidelink is a wireless direct communication link between the terminal device and the another terminal device.

In an optional embodiment, the first radio access system is a long term evolution LTE system, and the second radio access system is a new radio NR system; or the first radio access system is an NR system, and the second radio access system is an LTE system.

FIG. 9 is a schematic flowchart of another information transmission method 900 according to an embodiment of this application. The method 900 may be applied to the communication system 100 shown in FIG. 1. However, this embodiment of this application is not limited thereto.

S910: A terminal device determines that data information associated with a first radio access system needs to be sent or received on a first time domain resource, and synchronization information associated with a second radio access system needs to be sent or received on a second time domain resource, where the first time domain resource and the second time domain resource are completely or partially the same.

S920: When a priority of the data information is higher than a first threshold, the terminal device sends or receives the data information; or when a priority of the data information is lower than or equal to a first threshold, the terminal device sends or receives the synchronization information.

In an embodiment, the information transmission method in this embodiment of this application may alternatively be described as follows: The terminal device determines a first time domain resource used to send or receive data information associated with a first radio access system and a second time domain resource used to send or receive synchronization information associated with a second radio access system, where the first time domain resource and the second time domain resource completely or partially overlap. When a priority of the data information is higher than a first threshold, the terminal device sends or receives the data information on the first time domain resource; or when a priority of the data information is lower than or equal to a first threshold, the terminal device sends or receives the synchronization information on the second time domain resource.

It should be understood that the priority in this embodiment of this application is represented by a specific value. In the foregoing described method, it is considered by default that a smaller value indicates a lower priority, and a larger value indicates a higher priority.

In an embodiment, a smaller value indicates a higher priority, and a larger value indicates a lower priority. In this case, the information transmission method in this embodiment of this application may alternatively be described as follows: The terminal device determines that data information associated with a first radio access system needs to be sent or received on a first time domain resource, and synchronization information associated with a second radio access system needs to be sent or received on a second time domain resource, where the first time domain resource and the second time domain resource completely or partially overlap. When a priority of the data information is lower than a first threshold, the terminal device sends or receives the data information; or when a priority of the data information is higher than or equal to a first threshold, the terminal device sends or receives the synchronization information. In an embodiment, the information transmission method in this embodiment of this application may alternatively be described as follows: The terminal device determines a first time domain resource used to send or receive data information associated with a first radio access system and a second time domain resource used to send or receive synchronization information associated with a second radio access system, where the first time domain resource and the second time domain resource completely or partially overlap. When a priority of the data information is lower than a first threshold, the terminal device sends or receives the data information on the first time domain resource; or when a priority of the data information is higher than or equal to a first threshold, the terminal device sends or receives the synchronization information on the second time domain resource.

In this embodiment of this application, the data information is information that needs to be sent or received by the terminal device, and the synchronization information is information that needs to be sent or received by the terminal device. In other words, the data information and the synchronization information may be understood as to-be-sent information or to-be-received information, and have not been sent or received. Because time domain resources overlap, only one of the data information and the synchronization information can be sent or received, and the other one of the data information and the synchronization information cannot be sent or received.

It should be understood that the first time domain resource and the second time domain resource may be determined by the terminal device, or may be configured by a network device (or another terminal device) for the terminal device, that is, the network device (or the another terminal device) schedules the terminal device to send or receive the data information on the first time domain resource and send or receive the synchronization information on the second time domain resource. This is not limited in this embodiment of this application.

According to the information transmission method in this embodiment of this application, information with a higher priority in the first radio access system and the second radio access system is sent or received. This can resolve a problem of a conflict between resources used by the terminal device to send/receive information in different radio access systems, to avoid problems of increased interference and decreased communication quality that are caused by the conflict between resources. In addition, this ensures successful transmission of information with a high priority, and improves communication quality.

In an optional embodiment, the priority of the data information is predefined. Alternatively, the method further includes: The terminal device receives first indication information, where the first indication information indicates the priority of the data information.

The first indication information may be sent by the network device or the another terminal device to the terminal device by using physical layer signaling or higher layer signaling. The foregoing signaling may be radio resource control (RRC) signaling, media access control (MAC) signaling, downlink control information (DCI), or sidelink control information (SCI). This is not limited in this embodiment of this application.

The first threshold may be obtained by the terminal device in advance. In an optional embodiment, the first threshold is predefined, or the first threshold is notified by the network device or the another terminal device by using signaling.

In an optional embodiment, the data information associated with the first radio access system may be referred to as first data information, and data information associated with the second radio access system may be referred to as second data information. When the second data information that can be associated does not exist, the terminal device may use the method 900 in this embodiment of this application. In this embodiment, the second data information is data information that is last received or sent by the terminal device before the synchronization information and associated with the second radio access system. That is, a prerequisite for the terminal device to use the method 900 is that one or more of the following plurality of conditions are met:

(1) The second data information does not exist before the synchronization information is received or sent.

(2) The second data information does not exist in a first time interval that is before a moment at which the synchronization information is received or sent.

(3) The second data information exists before the synchronization information is received or sent, but a priority of the second data information is invalid.

(4) A priority of the synchronization information cannot be learned.

It should be understood that "the priority of the second data information is invalid" means that the second data information cannot be used to associate with the priority of the synchronization information outside a second time interval that starts from a moment at which the second data information is sent or received, that is, it is considered that the second data information that can be associated does not exist. On the contrary, the priority of the second data information is valid in the second time interval that starts from the moment at which the second data information is sent or received.

It should be further understood that the priority of the synchronization information may be predefined, preconfigured, associated with one or more of parameters such as a CBR, a CR, and QoS, configured by using higher layer RRC or MAC signaling, or dynamically indicated by using an SIB or physical layer signaling DCI or SCI. This is not limited in this embodiment of this application. That "the priority of the synchronization information cannot be learned" means that the terminal device cannot determine the priority of the synchronization information in the foregoing manner.

The first time interval and/or the second time interval may be understood as valid time windows/a valid time window. For example, the first time interval and/or the second time interval may be predefined in a protocol. Alternatively, the first time interval and/or the second time interval may be determined based on one or more of parameters such as the CBR, the CR, and the QoS (for example, a 5QI, PPPP, a priority, a latency, or reliability). Alternatively, the first time interval and/or the second time interval may be configured by the network device by using RRC signaling or MAC signaling. Alternatively, the first time interval and/or the second time interval may be dynamically indicated by using physical layer signaling DCI or SCI. This is not limited in this embodiment of this application.

In an embodiment, the plurality of conditions may be randomly combined in a preconfigured or predefined manner, and a determining sequence of the plurality of conditions is not limited in this embodiment of this application. For example, the terminal device may use the method 900 when both the condition (1) and the condition (4) are met. Alternatively, the terminal device may use the method 900 when all the four conditions are met. For a case in which one or more of the foregoing conditions are not met, that is, the method 900 cannot be used, for an information transmission method of the terminal device, refer to the method 200. Details are not described herein again.

In an optional embodiment, processing time of the terminal device needs to be considered during information transmission, and the processing time may include priority decoding time and comparison time. The method further includes: The terminal device determines the priority of the data information before the processing time.

It is assumed that the processing time of the terminal device is one slot. In this case, if the terminal device has not obtained the priority of the data information one slot before an earlier slot in a slot corresponding to the data information and a slot corresponding to the synchronization information, the terminal device may perform processing through implementation by the terminal device. This is not limited in this embodiment of this application.

In an optional embodiment, that the terminal device sends or receives the data information includes: The terminal device sends or receives the data information through a sidelink. Alternatively, that the terminal device sends or receives the synchronization information includes: The terminal device sends or receives the synchronization information through a sidelink.

It should be understood that a link for sending or receiving the foregoing information is not limited in this embodiment of this application, and may be an uplink or a downlink between the terminal device and the network device, or may be a sidelink between terminal devices. The sidelink is a wireless direct communication link between the terminal device and the another terminal device.

In an optional embodiment, the first radio access system is a long term evolution LTE system, and the second radio access system is a new radio NR system; or the first radio access system is an NR system, and the second radio access system is an LTE system.

The sequence numbers of the foregoing processes do not mean execution sequences. The execution sequences of the processes should be determined according to functions and internal logic of the processes, and should not be construed as any limitation on the implementation processes of the embodiments of this application.

Figure 11:
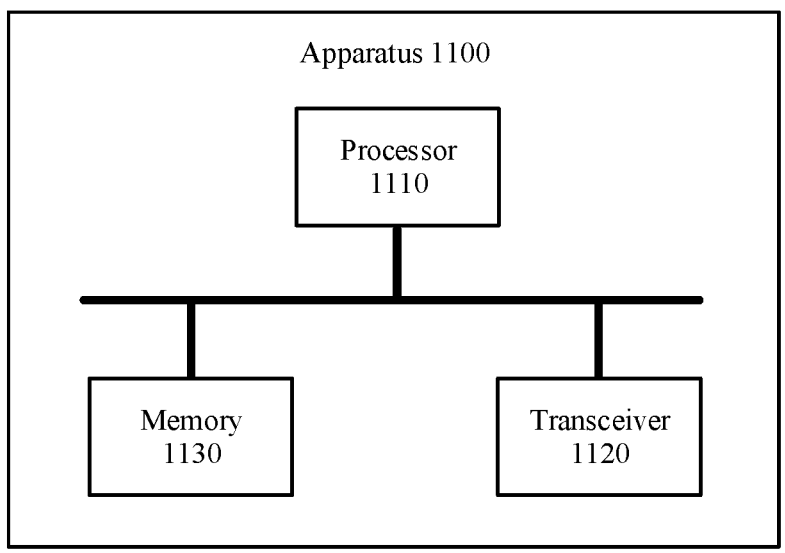
FIG. 11 is a schematic block diagram of another information transmission apparatus according to an embodiment of this application.

The foregoing describes in detail information transmission methods according to the embodiments of this application with reference to FIG. 1 to FIG. 9, and the following describes in detail information transmission apparatuses according to the embodiments of this application with reference to FIG. 10 and FIG. 11.

FIG. 10 shows an information transmission apparatus 1000 according to an embodiment of this application. As shown in the figure, the apparatus 1000 may include a processing unit 1010 and a transceiver unit 1020.

In an embodiment, the apparatus 1000 may implement the operations or procedures performed by the terminal device in the embodiment of the method 200. For example, the apparatus 1000 may be a terminal device, or may be an apparatus that can support the terminal device in implementing a function of the terminal device, for example, a chip or a chip system that can be used in the terminal device. When the apparatus is the terminal device, the transceiver unit may be a transceiver, where the transceiver may include an antenna, a radio frequency circuit, and the like; the processing unit may be a processor, for example, a central processing unit (CPU). When the apparatus is a component having the function of the terminal device, the transceiver unit may be a radio frequency unit, and the processing unit may be a processor. When the apparatus is the chip system, the transceiver unit may be an input/output interface of the chip system, and the processing unit may be a processor of the chip system.

The processing unit 1010 is configured to determine information with a higher priority in first information associated with a first radio access system and second information associated with a second radio access system, where time domain resources associated with the first information and the second information are completely or partially the same, and the first information is data information and the second information is synchronization information, or the first information is synchronization information and the second information is synchronization information. The transceiver unit 1020 is configured to send or receive the information with the higher priority.

In an embodiment, the first information is information that needs to be sent or received by the apparatus, and the second information is information that needs to be sent or received by the apparatus.

In an embodiment, the first information is first data information and the second information is synchronization information. The processing unit 1010 is configured to: when a priority of the first data information is higher than a priority of second data information, determine that the first data information is the information with the higher priority; or when a priority of the first data information is lower than or equal to a priority of second data information, determine that the synchronization information is the information with the higher priority, where the second data information is data information that is last received or sent by the apparatus and associated with the second radio access system.

In an embodiment, the first information is first synchronization information and the second information is second synchronization information. The processing unit 1010 is configured to: when a priority of first data information is higher than a priority of second data information, determine that the first synchronization information is the information with the higher priority; or when a priority of first data information is lower than or equal to a priority of second data information, determine that the second synchronization information is the information with the higher priority, where the first data information is data information that is last received or sent by the apparatus and associated with the first radio access system, and the second data information is data information that is last received or sent by the apparatus and associated with the second radio access system.

In an embodiment, the transceiver unit 1020 is further configured to: receive first indication information and second indication information, where the first indication information indicates the priority of the first data information, and the second indication information indicates the priority of the second data information; and determine information with a higher priority in the first data information and the second data information based on the first indication information and the second indication information.

In an embodiment, a priority of the first information and/or a priority of the second information are/is predefined; a priority of the first information and/or a priority of the second information are/is determined based on a first parameter, where the first parameter is one or more of a channel busy ratio, a channel occupancy ratio, and quality of service; or the transceiver unit 1020 is further configured to: receive third indication information and fourth indication information, where the third indication information indicates the priority of the first information, and the fourth indication information indicates the priority of the second information; and the processing unit 1010 is further configured to: determine the information with the higher priority in the first information and the second information based on the third indication information and the fourth indication information.

In an embodiment, the first information is first synchronization information and the second information is second synchronization information. The processing unit 1010 is configured to: when a synchronization source of the first radio access system is the same as a synchronization source of the second radio access system, and a priority of a synchronization mode of the first radio access system is higher than a priority of a synchronization mode of the second radio access system, determine that the first synchronization information is the information with the higher priority; or when a synchronization source of the first radio access system is different from a synchronization source of the second radio access system, and the synchronization source of the first radio access system is of a first type, determine that the first synchronization information is the information with the higher priority, where the first type is a satellite, a network device, or a terminal.

In an embodiment, the first information is first synchronization information and the second information is second synchronization information. The processing unit 1010 is configured to: when the apparatus is in an out-of-synchronization state in the first radio access system, determine that the first synchronization information is the information with the higher priority; or when the apparatus is in an out-of-synchronization state in the second radio access system, determine that the second synchronization information is the information with the higher priority.

In an embodiment, the first information is first synchronization information and the second information is second synchronization information, the first synchronization information needs to be sent or received once in a corresponding first synchronization information sending periodicity, and the second synchronization information needs to be sent or received for a plurality of times in a corresponding second synchronization information sending periodicity. The processing unit 1010 is configured to: determine that the first synchronization information is the information with the higher priority.

In an embodiment, the first information is data information and the second information is synchronization information. The processing unit 1010 is configured to: determine that the synchronization information is the information with the higher priority; or when the data information includes channel state information CSI, or the data information is sent/received together with a physical sidelink feedback channel PSFCH, determine that the data information is the information with the higher priority.

In an embodiment, a time domain resource of the first information overlaps with time domain resources of at least two pieces of information associated with the second radio access system, the at least two pieces of information include the second information, and the second information is the first piece of information in time domain in the at least two pieces of information, or the second information is one of the at least two pieces of information; or a time domain resource of the second information overlaps with time domain resources of at least two pieces of information associated with the first radio access system, the at least two pieces of information include the first information, and the first information is the first piece of information in time domain in the at least two pieces of information, or the first information is one of the at least two pieces of information.

In an embodiment, the transceiver unit 1020 is configured to: send or receive the information with the higher priority through a sidelink.

In an embodiment, the first radio access system is a long term evolution LTE system, and the second radio access system is a new radio NR system; or the first radio access system is an NR system, and the second radio access system is an LTE system.

In an embodiment, the apparatus 1000 may implement the operations or procedures performed by the terminal device in the embodiment of the method 900. For example, the apparatus 1000 may be a terminal device, or may be an apparatus that can support the terminal device in implementing a function of the terminal device, for example, a chip or a chip system that can be used in the terminal device. When the apparatus is the terminal device, the transceiver unit may be a transceiver, where the transceiver may include an antenna, a radio frequency circuit, and the like; the processing unit may be a processor, for example, a central processing unit (CPU). When the apparatus is a component having the function of the terminal device, the transceiver unit may be a radio frequency unit, and the processing unit may be a processor. When the apparatus is the chip system, the transceiver unit may be an input/output interface of the chip system, and the processing unit may be a processor of the chip system.

The processing unit 1010 is configured to determine that data information associated with a first radio access system needs to be sent or received on a first time domain resource, and synchronization information associated with a second radio access system needs to be sent or received on a second time domain resource, where the first time domain resource and the second time domain resource are completely or partially the same. The transceiver unit 1020 is configured to: when a priority of the data information is higher than a first threshold, send or receive the data information; or when a priority of the data information is lower than or equal to a first threshold, send or receive the synchronization information.

In an embodiment, the priority of the data information is predefined; or the transceiver unit 1020 is further configured to: receive first indication information, where the first indication information indicates the priority of the data information.

In an embodiment, the first threshold is predefined, or the first threshold is notified by a network device or another terminal device by using signaling.

In an embodiment, the first radio access system is a long term evolution LTE system, and the second radio access system is a new radio NR system; or the first radio access system is an NR system, and the second radio access system is an LTE system.

It should be understood that, the apparatus 1000 herein is represented in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a combinational logic circuit, and/or another appropriate component that supports the described function. In an example, one of ordinary skill in the art may understand that the apparatus 1000 may be the terminal device in the foregoing embodiment, and the apparatus 1000 may be configured to perform the procedures and/or the operations corresponding to the terminal device in the foregoing method embodiment. To avoid repetition, details are not described herein again.

The apparatus 1000 has a function for implementing the corresponding operations performed by the terminal device in the foregoing method. The function may be implemented by hardware, or may be implemented by hardware executing corresponding software. The hardware or the software includes one or more modules corresponding to the foregoing function. For example, the transceiver unit 1020 may include a sending unit and a receiving unit. The sending unit may be configured to implement operations and/or procedures that correspond to the transceiver unit and that are used to perform a sending action, and the receiving unit may be configured to implement operations and/or procedures that correspond to the transceiver unit and that are used to perform a receiving action. The sending unit may be replaced with a transmitter, and the receiving unit may be replaced with a receiver, to separately perform receiving and sending operations and related processing operations in the method embodiments. For another example, the transceiver unit 1020 may be replaced with a communication interface, to perform a transceiver operation in the method embodiments. In this embodiment of this application, the communication interface may be an apparatus that can implement a communication function, for example, a circuit, a module, a bus, a bus interface, or a transceiver. It should be understood that the processing unit 1010 in the foregoing embodiment may be implemented by a processor or a processor-related circuit, and the transceiver unit 1020 may be implemented by a transceiver, a transceiver-related circuit, or an interface circuit.

In an embodiment, the apparatus may further include a storage unit. The storage unit is configured to store a computer program. The processing unit 1010 may invoke the computer program from the storage unit and run the computer program, so that the apparatus 1000 performs the method of the terminal device in the foregoing method embodiment. This is not limited in this embodiment of this application.

In addition, the units in the foregoing embodiment may also be referred to as modules, circuits, or components. In this embodiment of this application, the apparatus in FIG. 10 may alternatively be a chip or a chip system, for example, a system on chip (SoC). Correspondingly, the transceiver unit may be a transceiver circuit of the chip. This is not limited herein.

FIG. 11 shows another information transmission apparatus 1100 according to an embodiment of this application. The apparatus 1100 includes a processor 1110 and a transceiver 1120. In an embodiment, the apparatus 1100 may further include a memory 1130. In an embodiment, the memory 1130 may be included in the processor 1110. The processor 1110, the transceiver 1120, and the memory 1130 communicate with each other by using an internal connection path. The memory 1130 is configured to store instructions. The processor 1110 is configured to execute the instructions stored in the memory 1130, to implement the method provided in the embodiments of this application.

In an embodiment, the apparatus 1100 is configured to perform the procedures and operations corresponding to the terminal device in the method 200 provided in the embodiments of this application.

The processor 1110 is configured to: determine information with a higher priority in first information associated with a first radio access system and second information associated with a second radio access system, where time domain resources associated with the first information and the second information are completely or partially the same, and the first information is data information and the second information is synchronization information, or the first information is synchronization information and the second information is synchronization information; and send or receive the information with the higher priority through the transceiver 1120.

In an embodiment, the apparatus 1100 is configured to perform the procedures and operations corresponding to the terminal device in the method 900 provided in the embodiments of this application.

The processor 1110 is configured to: determine that data information associated with a first radio access system needs to be sent or received on a first time domain resource, and synchronization information associated with a second radio access system needs to be sent or received on a second time domain resource, where the first time domain resource and the second time domain resource are completely or partially the same; and when a priority of the data information is higher than a first threshold, send or receive the data information through the transceiver 1120; or when a priority of the data information is lower than or equal to a first threshold, send or receive the synchronization information through the transceiver 1120.

It should be understood that the apparatus 1100 may be the terminal device in the foregoing embodiment, and may be configured to perform the operations and/or the procedures corresponding to the terminal device in the foregoing method embodiment. In an embodiment, the memory 1130 may include a read-only memory and a random access memory, and provides instructions and data to the processor. Apart of the memory may further include a non-volatile random access memory. For example, the memory may further store information about a device type. The processor 1110 may be configured to execute the instructions stored in the memory. When the processor 1110 executes the instructions stored in the memory, the processor 1110 is configured to perform the operations and/or the procedures corresponding to the terminal device in the foregoing method embodiments.

It should be understood that in the embodiments of this application, the processor in the foregoing apparatus may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

In an embodiment, the operations in the foregoing method can be implemented by using a hardware integrated logic circuit in the processor, or by using instructions in a form of software. The operations of the method disclosed with reference to the embodiments of this application may be directly performed by a hardware processor, or may be performed by using a combination of hardware and a software unit that are in the processor. The software unit may be located in a mature storage medium in the art, for example, a random access memory, a flash memory, a read-only memory, a programmable read-only memory, an electrically erasable programmable memory, or a register. The storage medium is located in the memory, and the processor executes the instructions in the memory and completes the operations in the foregoing method in combination with hardware of the processor. To avoid repetition, details are not described herein again.

It may be understood that the memory in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and method described in this specification includes but is not limited to these memories and any memory of another proper type.

In this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of these items, including any combination of singular items (pieces) or plural items (pieces). For example, at least one of a, b, or c may indicate a, b, c, a and b, a and c, b and c, or a, b, and c, where a, b, and c may be singular or plural.

A person of ordinary skill in the art may be aware that, in combination with the examples described in the embodiments disclosed in this specification, method operations and units may be implemented by electronic hardware, computer software, or a combination thereof. To clearly describe the interchangeability between the hardware and the software, the foregoing has generally described operations and compositions of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by one of ordinary skill in the art that, for convenience and brevity of description, for a working process of the foregoing system, apparatus, and unit, refer to a corresponding process in the method embodiment. Details are not described herein again. In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments in this application.

In addition, functional units in the embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium.

All or some of the methods in the embodiments of this application may be implemented by using software, hardware, firmware, or any combination thereof. When being implemented by using the software, all or some of the methods may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing descriptions are merely embodiments of this application, but are not intended to limit the protection scope of this application. Any equivalent modification or replacement readily figured out by one of ordinary skill in the art within the technical scope disclosed in this application shall fall within the protection scope of this application. Therefore, the protection scope of this application shall be subject to the protection scope of the claims.

What is claimed is:

1. An information transmission method performed by a terminal device or a chip in a terminal device, comprising:
   determining information with a higher priority in first information associated with a first radio access system and second information associated with a second radio access system, wherein time domain resources associated with the first information and the second information are completely or partially the same, and the first information is data information and the second information is second synchronization information, wherein the second synchronization information includes sidelink synchronization signal; and
   sending or receiving the information with the higher priority, wherein the priority of the data information is indicated by sidelink control information (SCI) and the priority of the second synchronization information is indicated by radio resource channel (RRC) signaling.

2. The method of claim 1, wherein
   the determining the information with the higher priority in the first information associated with the first radio access system and the second information associated with the second radio access system comprises:
   when a priority of first data information is lower than or equal to a priority of second data information, determining that the second synchronization information is the information with the higher priority, wherein
   the first data information is data information that is last received or sent by the terminal device and associated with the first radio access system, and the second data information is data information that is last received or sent by the terminal device and associated with the second radio access system.

3. The method of claim 1, wherein at least one of a priority of the first information or a priority of the second information is predefined; or
   at least one of a priority of the first information, or a priority of the second information is determined based on a first parameter, wherein the first parameter is one or more of a channel busy ratio, a channel occupancy ratio, and a quality of service; or
   the method further comprises:
      receiving third indication information and fourth indication information, wherein the third indication information indicates the priority of the first information, and the fourth indication information indicates the priority of the second information;
   and
   the determining the information with the higher priority in the first information associated with the first radio access system and the second information associated with the second radio access system comprises:
   determining the information with the higher priority in the first information and the second information based on the third indication information and the fourth indication information.

4. The method of claim 1, wherein the method further comprises:
   determining the priority of the first information and the priority of the second information before processing time of an earlier slot in a slot corresponding to the first information and a slot corresponding to the second information.

5. The method of claim 1, wherein the first radio access system is a long term evolution (LTE) system, and the second radio access system is a new radio (NR) system; or
the first radio access system is an NR system, and the second radio access system is an LTE system.

6. A method performed by a terminal device or a chip in a terminal device, comprising:
determining that data information associated with a first radio access system needs to be sent or received on a first time domain resource, and synchronization information associated with a second radio access system needs to be sent or received on a second time domain resource, the synchronization information includes a sidelink synchronization signal, wherein the first time domain resource and the second time domain resource are completely or partially the same; and
when a priority of the data information is higher than a first threshold, sending or receiving the data information; or
when a priority of the data information is lower than or equal to a first threshold, sending or receiving the synchronization information, wherein the synchronization information carries a synchronization signal used to synchronize the terminal device to the second radio access system, wherein the priority of the data information is indicated by sidelink control information (SCI) and a priority of the synchronization information is indicated by radio resource channel (RRC) signaling.

7. The method of claim 6, wherein the priority of the data information is predefined; or
the method further comprises:
receiving first indication information, wherein the first indication information indicates the priority of the data information.

8. The method of claim 6, wherein the first threshold is predefined, or the first threshold is notified by a network device or another terminal device by using signaling.

9. The method of claim 6, wherein the first radio access system is a long term evolution (LTE) system, and the second radio access system is a new radio (NR) system; or
the first radio access system is an NR system, and the second radio access system is an LTE system.

10. The method of claim 6, wherein the method further comprises:
determining the priority of the data information and the priority of the synchronization information before processing time of an earlier slot in a slot corresponding to the data information and a slot corresponding to the synchronization information.

11. A communication apparatus, comprising:
one or more processors; and
a memory, wherein the memory stores a computer program, and when executing the computer program stored in the memory, the one or more processors executes operations comprising:
determining information with a higher priority in first information associated with a first radio access system and second information associated with a second radio access system, wherein time domain resources associated with the first information and the second information are completely or partially the same, and the first information is data information and the second information is second synchronization information, wherein the second synchronization information includes a sidelink synchronization signal block (S-SSB); and
sending or receiving the information with the higher priority, wherein the priority of the data information is indicated by sidelink control information (SCI) and the priority of the second synchronization information is indicated by radio resource channel (RRC) signaling.

12. The communication apparatus of claim 11, wherein the one or more processors executes operations further comprising:
when a priority of first data information is lower than or equal to a priority of second data information, determining that the second synchronization information is the information with the higher priority, wherein
first data information is data information that is last received or sent by the communication apparatus and associated with the first radio access system, and the second data information is data information that is last received or sent by the communication apparatus and associated with the second radio access system.

13. The communication apparatus of claim 11, wherein at least one of a priority of the first information or a priority of the second information is predefined;
at least one of a priority of the first information or a priority of the second information is determined based on a first parameter, wherein the first parameter is one or more of a channel busy ratio, a channel occupancy ratio, and a quality of service; or
the one or more processors executes operations further comprising:
receiving third indication information and fourth indication information, wherein the third indication information indicates the priority of the first information, and the fourth indication information indicates the priority of the second information; and
determining the information with the higher priority in the first information and the second information based on the third indication information and the fourth indication information.

14. The communication apparatus of claim 11, wherein the one or more processors executes operations further comprises:
determining the priority of the data information and the priority of the second synchronization information before processing time of an earlier slot in a slot corresponding to the data information and a slot corresponding to the second synchronization information.

15. The communication apparatus of claim 11, wherein the first radio access system is a long term evolution (LTE) system, and the second radio access system is a new radio (NR) system; or
the first radio access system is an NR system, and the second radio access system is an LTE system.

16. A communication apparatus, comprising:
one or more processors; and
a memory, wherein the memory stores a computer program, and when executing the computer program stored in the memory, the one or more processors executes operations comprising:
determining that data information associated with a first radio access system needs to be sent or received on a first time domain resource, and synchronization information associated with a second radio access system needs to be sent or received on a second time domain resource, the synchronization information includes a sidelink synchronization signal, wherein the first time domain resource and the second time domain resource are completely or partially the same; and when a priority of the data information is higher than a first threshold, sending or receiving the data information; or when a priority of the data information is lower than or equal to a first threshold, send or receive the synchronization information, wherein the synchronization information carries a synchronization signal used to synchronize the communication apparatus to the second radio access system, wherein the priority of the data information is indicated by sidelink control information (SCI) and the priority of the synchronization information is indicated by radio resource channel (RRC) signaling.

17. The communication apparatus of claim 16, wherein the priority of the data information is predefined; or
 the one or more processors executes operations further comprising:
  receiving first indication information, wherein the first indication information indicates the priority of the data information.

18. The communication apparatus of claim 16, wherein the first threshold is predefined, or the first threshold is notified by a network device or another terminal device by using signaling.

19. The communication apparatus of claim 16, wherein the first radio access system is a long term evolution (LTE) system, and the second radio access system is a new radio (NR) system; or
 the first radio access system is an NR system, and the second radio access system is an LTE system.

20. The communication apparatus of claim 16, wherein the one or more processors executes operations further comprises:
 determining the priority of the data information and the priority of the second synchronization information before processing time of an earlier slot in a slot corresponding to the data information and a slot corresponding to the synchronization information.

* * * * *

UNITED STATES PATENT AND TRADEMARK OFFICE
CERTIFICATE OF CORRECTION

PATENT NO. : 12,426,076 B2
APPLICATION NO. : 17/671977
DATED : September 23, 2025
INVENTOR(S) : Zhe Liu et al.

It is certified that error appears in the above-identified patent and that said Letters Patent is hereby corrected as shown below:

In the Claims

In Column 44, Claim 1, Line 5, delete "An information transmission method" and insert --A method--.

In Column 44, Claim 1, Line 16-17, delete "information includes sidelink" and insert --information includes a sidelink--.

In Claim 48, Claim 20, Line 15, delete "of the second synchronization" and insert --of the synchronization--.

Signed and Sealed this
Twenty-seventh Day of January, 2026

John A. Squires
*Director of the United States Patent and Trademark Office*